US008525823B2

(12) United States Patent
Sano et al.

(10) Patent No.: US 8,525,823 B2
(45) Date of Patent: Sep. 3, 2013

(54) LIQUID CRYSTAL DISPLAY DEVICE

(75) Inventors: Yuma Sano, Kanagawa-ken (JP); Ryosuke Nonaka, Kanagawa-ken (JP); Masahiro Baba, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 163 days.

(21) Appl. No.: 13/235,959

(22) Filed: Sep. 19, 2011

(65) Prior Publication Data

US 2012/0242709 A1 Sep. 27, 2012

(30) Foreign Application Priority Data

Mar. 24, 2011 (JP) ................................ P2011-065273

(51) Int. Cl.
*G06F 3/038* (2013.01)
*G09G 5/10* (2006.01)

(52) U.S. Cl.
USPC ............................................ 345/212; 345/690

(58) Field of Classification Search
USPC .................. 345/211, 212, 175, 419, 690, 156
See application file for complete search history.

(56) References Cited

U.S. PATENT DOCUMENTS

2010/0103089 A1* 4/2010 Yoshida et al. ............... 345/102
2010/0156955 A1* 6/2010 Kimura .......................... 345/690
2011/0239363 A1 10/2011 Nagamatsu et al.

FOREIGN PATENT DOCUMENTS

JP 2006-292914 10/2006
JP 2008-102379 5/2008

* cited by examiner

*Primary Examiner* — Michael Faragalla
(74) *Attorney, Agent, or Firm* — Turocy & Watson, LLP

(57) ABSTRACT

According to one embodiment, an image display device has a liquid crystal panel, a backlight, an intensity setting unit, a presumption unit, a signal correction unit, an error calculation unit and a control unit. The intensity setting unit sets intensities of the light sources, respectively. The presumption unit presumes color information based on intensity information representing the intensities. The signal correction unit corrects an input video signal according to the color information, and obtains a corrected video signal. The error calculation unit presumes a display image from the corrected video signal and the input video signal, and calculates display errors between the presumed display image and an input image corresponding to the input video signal. The control unit controls sets the intensities of the light sources as the emission intensities of the backlight so that the display errors obtained from the error calculation unit can be minimum.

9 Claims, 14 Drawing Sheets

LIQUID CRYSTAL DISPLAY DEVICE

CROSS-REFERENCE TO RELATED APPLICATION(S)

This application is based upon and claims the benefit of priority from the prior Japanese Patent Application No. 2011-65273, filed on Mar. 24, 2011, the entire contents of which are incorporated herein by reference.

FIELD

Embodiments described herein relate generally to a liquid crystal display device.

BACKGROUND

A liquid crystal display (LCD) device which has a back light provided with light sources of a plurality of colors is known. In order to improve contrast of a video image to be displayed, to increase a color reproduction gamut and to reduce power consumption, a technique for controlling brightness and color of a light which is emitted from a backlight of an LCD device according to an input video signal is also known.

In the technique described above, the emission intensities of light sources of R (red), G (green) and B (blue) colors are set according to a maximum signal value among signal values of R, G and B color components of the input video signal. Further, the signal value to be transmitted to a liquid crystal panel is corrected considering that a light from a light source of each color is likely to leak from a liquid crystal cell of another color.

Since the technique is based on a precondition that the R, G and B color components of the input video signal correspond to the colors of the light sources in one-on-one manner respectively, the number of the colors of the light sources are limited to three of the R, G and B colors.

According to the above technique, when there is a pixel in which a certain color component has a maximum signal value, the intensity of the light source of the corresponding color is set to a maximum intensity. On the other hand, a lower limit of transmission rate of the liquid crystal panel is larger than zero. Thus, a pixel where the signal value of the color component is zero is difficult to be displayed. For example, when white (R=G=B=266) and red (R=255 and G=B=0) are simultaneously present within a screen, according to the above technique, all of the intensities of the R, G and B light sources are set to a maximum value, and all of the R, G and B signal values transmitted to the liquid crystal panel are set to a maximum value. As a result, the transmission rate becomes maximum, and “white” is accurately displayed. Since the light components of G and B are unnecessary to display red, the signal values to be transmitted to the liquid crystal panel are set to zero (G=B=0). However, since the lights of the G and B light sources leak actually, a desired red is not displayed and a color more whitish than assumed is displayed.

DETAILED DESCRIPTION

Figure 1:
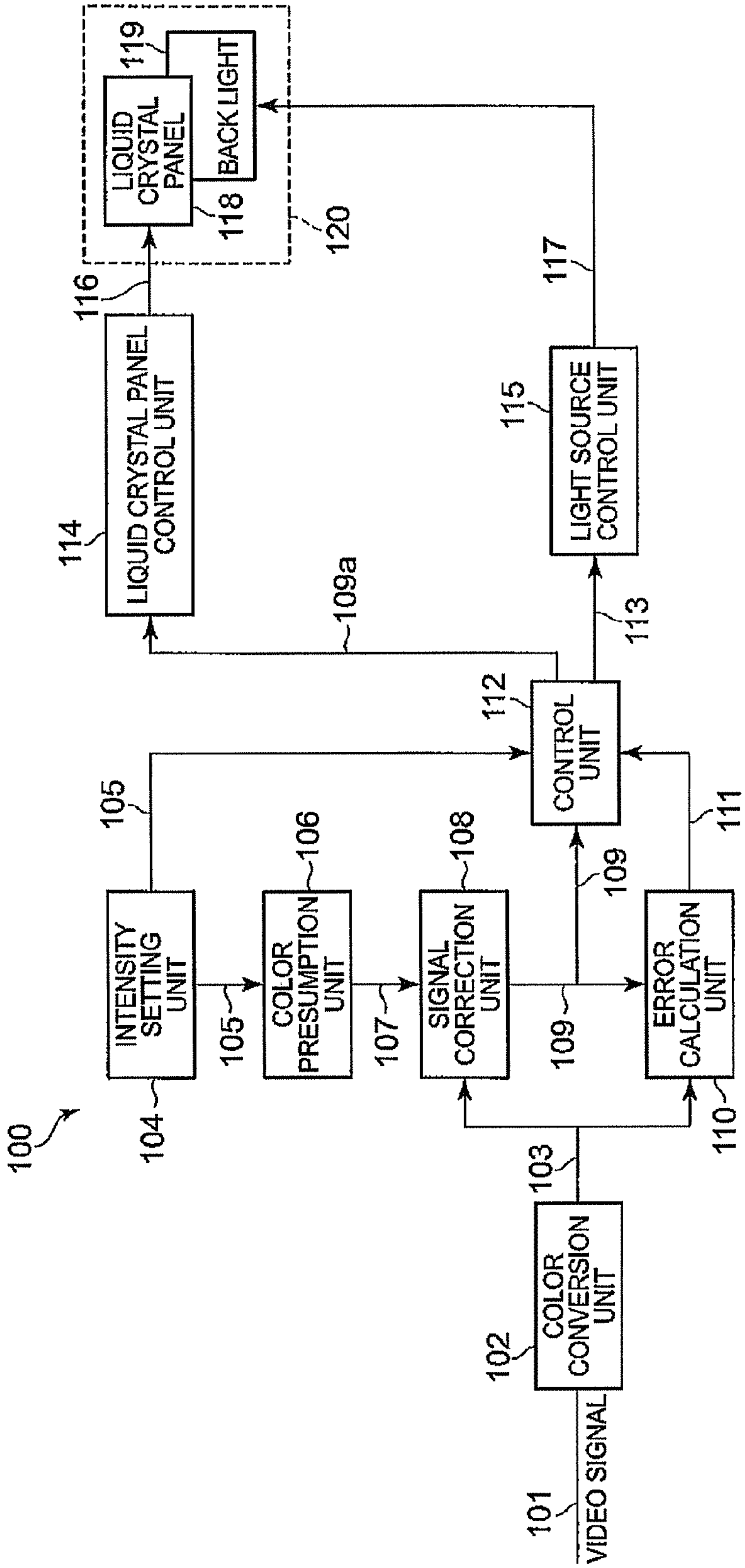
FIG. 1 is a block diagram of an LCD device according to a first embodiment.

According to one embodiment, an image display device is provided. The image display device has a liquid crystal panel, a backlight, an intensity setting unit, a presumption unit, a signal correction unit, an error calculation unit and a control unit.

The backlight has a plurality of light sources which emit lights having different peak wavelengths. Emission intensities of the light sources are independently controllable, respectively.

The intensity setting unit sets intensities of the plurality of light sources, respectively. The presumption unit presumes color information of a transmitted light to be obtained when a mixture of lights emitted from the light sources at the intensities passes through the liquid crystal panel, based on intensity information representing the intensities set by the intensity setting unit. The signal correction unit corrects an input video signal according to the color information, and obtains a corrected video signal. The error calculation unit presumes a display image to be obtained when the liquid crystal panel receives the corrected video signal and the mixture light enters into the liquid crystal panel. The error calculation unit calculates display errors in brightness and color between the presumed display image and an input image corresponding to the input video signal. The control unit controls to set the intensities of the light sources as the emission intensities of the backlight so that the display errors obtained from the error calculation unit can be minimum.

Hereinafter, further embodiments will be described with reference to the drawings. In the drawings, the same reference numerals denote the same or similar portions respectively.

A first embodiment will be described with reference to FIG. 1.

FIG. 1 is a block diagram of an LCD device 100 according to the first embodiment. The LCD device 100 according to the embodiment is provided with a color conversion unit 102, an intensity setting unit 104, a color presumption unit 106, a signal correction unit 108, an error calculation unit 110, a control unit 112, a liquid crystal control unit 114, a light source control unit 115, and an image display unit 120.

The image display unit 120 is provided with a backlight 119 and a liquid crystal panel 118. The backlight 119 has light sources of a plurality of colors having different emission peak wavelengths. The backlight 119 can modulate an intensity of a light emitted through a whole surface of the backlight collectively. The liquid crystal panel 118 modulates transmittance i.e. transmission rate or reflectance i.e. reflection rate of the light from the backlight 119. The following example shows a case where the backlight 119 includes light-emitting diode (LED) light sources of three primary colors of R, G and B whose intensities can be independently controlled.

The color conversion unit 102 performs gamma conversion and color conversion of an input video signal 101, and obtains a converted video signal 103. However, when the input video signal 101 is subjected to gamma conversion and color conversion outside the LCD device 100 in advance, the input video signal 101 may be used as the video signal 103 as it is. In this case, the LCD device 100 does not need necessarily to provided with the color conversion unit 102.

The intensity setting unit 104 outputs a plurality of pieces of combination information sequentially. The pieces of combination information are obtained by changing gradation values of light source intensities of R, G, and B colors within a range from a minimum value to a maximum value. The pieces of combination information are previously stored in a lookup table, as light source intensity information 105. The outputted light source intensity information 105 is provided to the color presumption unit 106 and the control unit 112. The light source intensity information 105 is a set of information representing the intensity of the light source of each color. For example, in the case of three primary colors of R, G and B, the light source intensity information 105 represents a combination of information of an intensity of an R light source (a red light source), information of an intensity of a G light source (a green light source), and information of an intensity of a B light source (a blue light source).

The color presumption unit 106 presumes color information 107 of a transmitted light after a mixture of lights which is emitted from the light sources of the respective colors according to the light source intensity information 105 passes through the liquid crystal panel. The color presumption unit 106 provides the presumed color information 107 to the signal correction unit 108.

The signal correction unit 108 calculates a corrected video signal 109 based on the color-converted video signal 103 and the color information 107 of the transmitted light. The signal correction unit 108 provides the calculated corrected video signal 109 to the error calculation unit 110 and the control unit 112. The error calculation unit 110 calculates an error 111 to be caused at the time of video displaying, based on the corrected video signal 109 and the color-converted video signal 103. The error 111 is calculated with respect to each of the pieces of light source intensity information 105 outputted sequentially as described above.

The control unit 112 sets a piece of light source intensity information which makes the error 111 minimum among the pieces of light source intensity information 105, as emission intensity information 113 of the light sources. The control unit 112 provides the set emission intensity information 113 to the light source control unit 115.

Further, the control unit 112 provides a corrected video signal 109*a* among the corrected video signals 109 which corresponds to the pieces of light source intensity information 105, to the liquid crystal control unit 114. The corrected video signal 109*a* is obtained when the light sources perform light emission according to the emission intensity information 113. The liquid crystal control unit 114 generates a liquid crystal control signal 116 based on the corrected video signal 109*a*, and displays the corrected video signal 109*a* on the liquid crystal panel 118. The light source control unit 115 generates a light source control signal 117 based on the emission intensity information 113, and causes the backlight 119 to emit light corresponding to the emission intensity information 113.

Figure 2A:
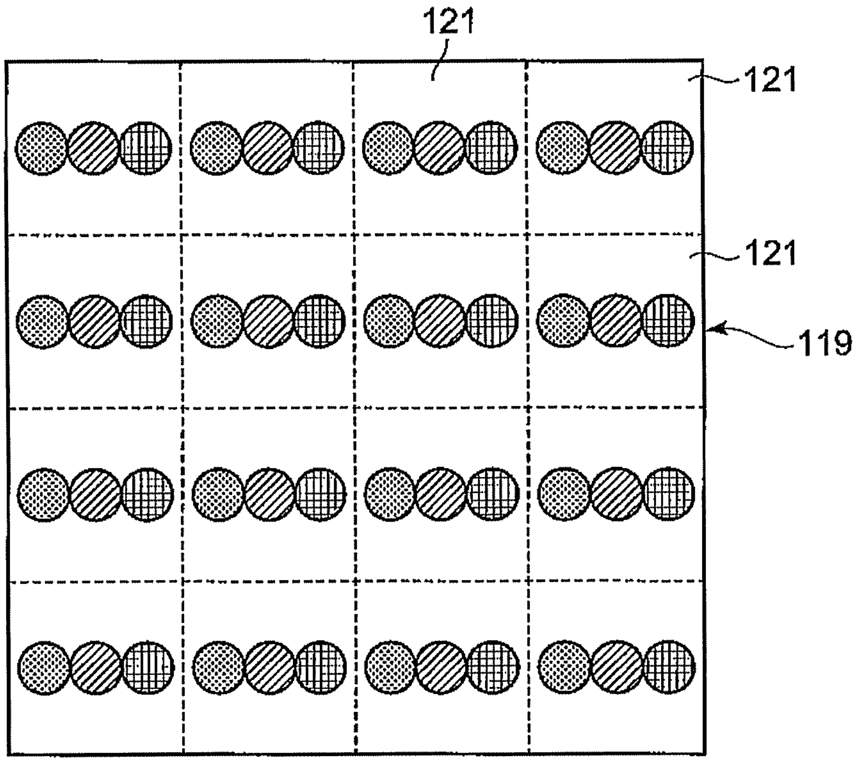
FIG. 2A is a schematic diagram of a backlight of the LCD device.
Figure 2B:
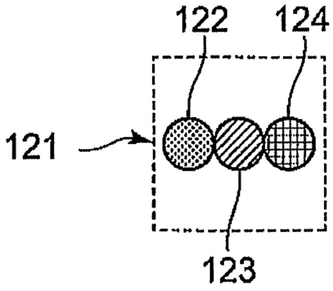
FIG. 2B is a schematic diagram of a unit light source.

FIG. 2A is a schematic diagram of the backlight 119 according to the embodiment. The backlight 119 is provided with a plurality of light sources 121 arranged in a matrix form. Each light source 121 includes an R light source 122, a G light source 123, and a B light source 124 as a unit light source as illustrated in FIG. 2B. Each of emission intensities of the R light source 122, the G light source 123, and the B light source 124 can be independently controlled. The same emission intensity is set to all of the R light sources 122 included in the light sources 121 of the backlight 119. Similarly, the same emission intensity is set to all of the G light sources 123 included in the light sources 121 of the backlight 119. Further, similarly, the same emission intensity is set to all of the B light sources 124 included in the light sources 121 of the backlight 119.

The configuration of the backlight illustrated in FIG. 2A is exemplary, and the backlight may have a different configuration. For example, the light sources of the backlight 119 are not limited to the light sources of three colors of R, G, and B, and the backlight 119 may include light sources of four or more colors having different peak wavelengths, or light sources of two colors having different peak wavelengths.

Figure 3:
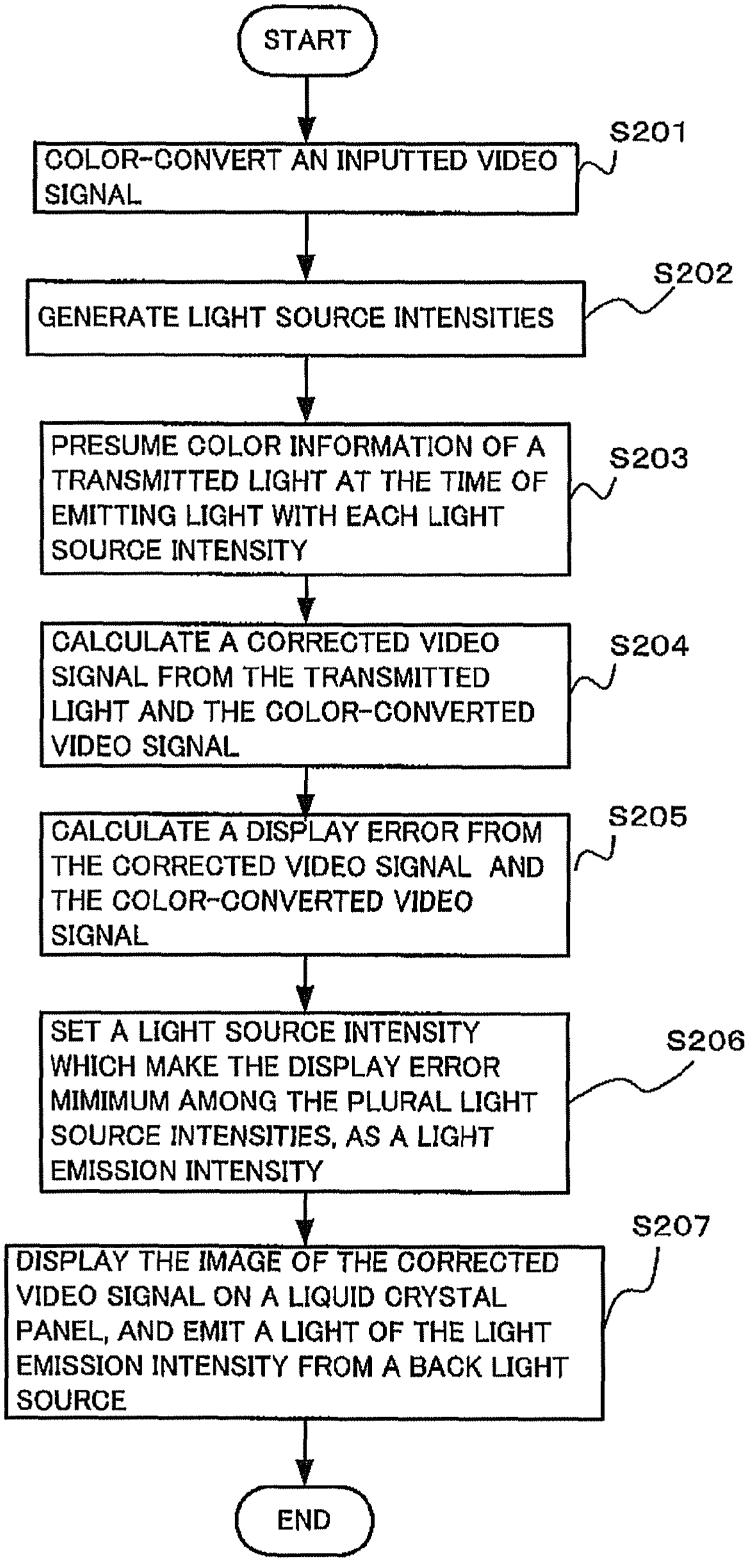
FIG. 3 is a flowchart illustrating an operation of the LCD device.

FIG. 3 is a flowchart illustrating an operation of the LCD device 100 according to the embodiment. In step S201, the color conversion unit 102 performs color conversion of the input video signal 101, and calculates the color-converted video signal 103. Specifically, the color conversion unit 102 performs gamma conversion according to Formula 1 with respect to respective gradation values of R, G, and B sub pixels which are arranged in respective pixels of the input video signal 101.

$$L_{in}R(x, y) = \left(\frac{S_{in}R(x, y)}{255}\right)^{\gamma} \quad (1)$$

$$L_{in}G(x, y) = \left(\frac{S_{in}G(x, y)}{255}\right)^{\gamma}$$

$$L_{in}B(x, y) = \left(\frac{S_{in}B(x, y)}{255}\right)^{\gamma}$$

In Formula 1, $S_{in}R(x, y)$, $S_{in}G(x, y)$ and $S_{in}B(x, y)$ represent gradation values of sub pixels of R, G, and B colors at coordinates (x, y) of the input video signal, and the gradation values are represented by 8 bits (a value 0 to a value 255). When gamma conversion is performed with respect to the gradation values $S_{in}R(x, y)$, $S_{in}G(x, y)$ and $S_{in}B(x, y)$ of the input video signal, gradation values $L_{in}R(x, y)$, $L_{in}G(x, y)$ and $L_{in}B(x, y)$ are obtained. The gradation values $L_{in}G(x, y)$, $L_{in}G(x, y)$ and $L_{in}B(x, y)$ are represented by relative values of zero (0) to one (1). γ represents a gamma coefficient. In the embodiment, gamma conversion is performed according to Formula 1, but processing of gamma conversion may be performed with reference to a previously prepared look-up table in which a gradation value of the input video signal is associated with a gradation value after gamma conversion.

The color conversion unit 102 performs the above described conversion of the values of the R, G, and B sub pixels of all pixels of the input video signal. The color conversion unit 102 obtains tristimulus values $X_{in}(x, y)$, $Y_{in}(x, y)$ and $Z_{in}(x, y)$ from the gradation values $L_{in}G(x, y)$, $L_{in}G(x, y)$ and $L_{in}B(x, y)$ of the input video signal based on Formula 2.

$$\begin{bmatrix} X_{in}(x, y) \\ Y_{in}(x, y) \\ Z_{in}(x, y) \end{bmatrix} = M \begin{bmatrix} L_{in}R(x, y) \\ L_{in}G(x, y) \\ L_{in}B(x, y) \end{bmatrix} \quad (2)$$

"M" of Formula 2 represents a 3×3 color conversion matrix. The color conversion matrix is used for changing a color space. The color conversion matrix is appropriately selected according to characteristics of an output device. The tristimulus values $X_{in}(x, y)$, $Y_{in}(x, y)$ and $Z_{in}(x, y)$ may be calculated for each pixel based on the gradation values $L_{in}R(x, y)$, $L_{in}G(x, y)$ and $L_{in}B(x, y)$ of the input video signal using the color conversion matrix of Formula 2. Alternately, the tristimulus values $X_{in}(x, y)$, $Y_{in}(x, y)$ and $Z_{in}(x, y)$ may be calculated for each pixel with reference to a look-up table which stores a relation between the tristimulus values $X_{in}(x, y)$, $Y_{in}(x, y)$ and $Z_{in}(x, y)$ obtained by color conversion and the gradation values $L_{in}R(x, y)$, $L_{in}G(x, y)$ and $L_{in}B(x, y)$. The color-converted input video signal 103 is input to the signal correction unit 108 and the error calculation unit 110.

On the other hand, in step S202, the intensity setting unit 104 sets the light source intensity information 105 of R, G, and B and provides the light source intensity information 105 to the color presumption unit 106. As described above, the intensity setting unit 104 according to the embodiment provides a plurality of pieces of combination information obtained by changing light source intensities of R, G, and B colors within the range from the minimum value to the maximum value, to the presumption unit 106.

For example, when the light source intensity of each color is represented in 8 bits, the number of steps of the intensity of each color is 256. Thus, intensities of three colors of R, G, and B have $(2^8)^3$ (=16,777,216) combinations. As will be described below as another embodiment, the intensity setting unit 104 may be configured to set the light source intensity information 105 of each of a plurality of colors which becomes a candidate of emission intensity 105, based on the color-converted video signal 103. In the case, the intensity setting unit 104 provides the light source intensity information 105 of the candidate to the color presumption unit 106.

Specifically, the intensity setting unit 104 may provide some of the combinations of the steps of the intensity of each color rather than all of combinations to the color presumption unit 106. For example, about 1000 steps (by 10 steps for each color of R, G and B) may be used. Further, as will be described below, the intensity setting unit 104 may be configured to update the light source intensity information 105 according to the error 111.

In step S203, the color presumption unit 106 presumes color information of the transmitted light after the mixture of the lights from the light sources of respective colors passes through the liquid crystal panel. The color information presumed by the color presumption unit 106 includes first, second and third tristimulus value of the transmitted light.

The first tristimulus value is a value of the transmitted light obtained when the mixture light is irradiated to the R pixel (gradation value: R=255, G=B=0) of the liquid crystal panel. The second tristimulus value is a value of the transmitted light obtained when the mixture light is irradiated to the G pixel (gradation value: G=255, R=B=0). The third tristimulus value is a value of the transmitted light obtained when the mixture light is irradiated to the B pixel (gradation value: B=255, R=G=0).

Specifically, the tristimulus values to be obtained when the light sources of the respective colors emit monochromatic light are measured in advance. Then, the color presumption unit 106 adds the values obtained by multiplying the respective tristimulus values obtained at the time of monochromatic light emission by respective emission intensities of the light sources of the colors, so as to presume the tristimulus values of the mixture light. The color presumption unit 106 provides the presumed tristimulus values to the signal correction unit 108.

The tristimulus values of the mixture light obtained when the light sources of R, G, and B colors emit light at intensities $R_{BL}$, $G_{BL}$ and $B_{BL}$ are calculated by Formulae 3-1, 3-2 and 3-3. The formula 3-1 is a formula for obtaining tristimulus values $X_{RW'}$, $Y_{RW'}$ and $Z_{RW'}$ of the transmitted light obtained when the mixture light is irradiated to the R pixel (gradation value: R=255, G=B=0). The formula 3-2 is a formula for obtaining tristimulus values $X_{GW'}$, $Y_{GW'}$ and $Z_{GW'}$ of the transmitted light obtained when the mixture light is irradiated to the G pixel (gradation value: G=255, R=B=0). The formula 3-3 is a formula for obtaining tristimulus values $X_{BW'}$, $Y_{BW'}$ and $Z_{BW'}$ of the transmitted light obtained when the mixture light is irradiated to the B pixel (gradation value: B=255, R=G=0). Hereinafter, the value denoted by one or more English characters with "prime", like $X_{RW'}$, represents an actually displayed value.

$$\begin{bmatrix} X_{RW'} \\ Y_{RW'} \\ Z_{RW'} \end{bmatrix} = \begin{bmatrix} X_{RR} & X_{RG} & X_{RB} \\ Y_{RR} & Y_{RG} & Y_{RB} \\ Z_{RR} & Z_{RG} & Z_{RB} \end{bmatrix} \begin{bmatrix} R_{BL} \\ G_{BL} \\ B_{BL} \end{bmatrix} \quad (3-1)$$

$$\begin{bmatrix} X_{GW'} \\ Y_{GW'} \\ Z_{GW'} \end{bmatrix} = \begin{bmatrix} X_{GR} & X_{GG} & X_{GB} \\ Y_{GR} & Y_{GG} & Y_{GB} \\ Z_{GR} & Z_{GG} & Z_{GB} \end{bmatrix} \begin{bmatrix} R_{BL} \\ G_{BL} \\ B_{BL} \end{bmatrix} \quad (3-2)$$

$$\begin{bmatrix} X_{BW'} \\ Y_{BW'} \\ Z_{BW'} \end{bmatrix} = \begin{bmatrix} X_{BR} & X_{BG} & X_{BB} \\ Y_{BR} & Y_{BG} & Y_{BB} \\ Z_{BR} & Z_{BG} & Z_{BB} \end{bmatrix} \begin{bmatrix} R_{BL} \\ G_{BL} \\ B_{BL} \end{bmatrix} \quad (3-3)$$

In Formulae 3-1, 3-2 and 3-3, $X_{RG}$, $Y_{RG}$ and $Z_{RG}$ represent an X component, a Y component, and a Z component of the tristimulus values of a light of the G light source passing through the R pixel, respectively. $X_{GB}$, $Y_{GB}$, $Z_{GB}$ represent an X component, a Y component, and a Z component of the tristimulus values of a light of the B light source passing through the G pixel, respectively. $X_{BR}$, $Y_{BR}$, $Z_{BR}$ represent an X component, a Y component, and a Z component of the tristimulus values of a light of the R light source passing through the B pixel, respectively. The same notation is applied to components of the other tristimulus values.

In step S204, the signal correction unit 108 produces a corrected video signal 109 for displaying the color-converted video signal 103 obtained when the mixture light corresponding to the transmitted light is irradiated to the liquid crystal panel 118, based on the presumed color information 107 of the transmitted light. Specifically, correction signal values $R_{LC}$(x, y), $G_{LC}$(x, y), $B_{LC}$(x, y) of the liquid crystal panel are calculated based on the tristimulus values of the mixture light and the tristimulus values $X_{in}$(x, y), $Y_{in}$(x, y) and $Z_{in}$(x, y) of the video signal 103 of each pixel as in Formula 4.

$$\begin{bmatrix} R_{LC}(x,y) \\ G_{LC}(x,y) \\ B_{LC}(x,y) \end{bmatrix} = \begin{bmatrix} X_{RW'} & X_{GW'} & X_{BW'} \\ Y_{RW'} & Y_{GW'} & Y_{BW'} \\ Z_{RW'} & Z_{GW'} & Z_{BW'} \end{bmatrix}^{-1} \begin{bmatrix} X_{in}(x,y) \\ Y_{in}(x,y) \\ Z_{in}(x,y) \end{bmatrix} \quad (4)$$

In Formulae 3-1, 3-2, 3-3 and 4, light leakage from the light sources arising when black is displayed on the liquid crystal panel 118 is not considered. The following Formulae 5 to 7 may be used for taking the light leakage into account.

Specifically, tristimulus values $X_{KW'}$, $Y_{KW'}$ and $Z_{KW'}$ of a light which are given when black is displayed on the liquid crystal panel are shown according to Formula 5. Formula 6 represents the relation among the tristimulus values $X_{KW'}$, $Y_{KW'}$ and $Z_{KW'}$ which is obtained when black is displayed, the tristimulus values $X_{in}$(x, y), $Y_{in}$(x, y) and $Z_{in}$(x, y) of the color-converted video signal, and the correction signal values $R_{LC}$(x, y), $G_{LC}$(x, y), $B_{LC}$(x, y). The correction signal values $R_{LC}$(x, y), $G_{LC}$(x, y) and $B_{LC}$(x, y) can be calculated by Formula 7.

$$\begin{bmatrix} X_{KW'} \\ Y_{KW'} \\ Z_{KW'} \end{bmatrix} = \begin{bmatrix} X_{KR} & X_{KG} & X_{KB} \\ Y_{KR} & Y_{KG} & Y_{KB} \\ Z_{KR} & Z_{KG} & Z_{KB} \end{bmatrix} \begin{bmatrix} R_{BL} \\ G_{BL} \\ B_{BL} \end{bmatrix} \quad (5)$$

$$\begin{bmatrix} X_{in}(x,y) \\ Y_{in}(x,y) \\ Z_{in}(x,y) \end{bmatrix} = \begin{bmatrix} (X_{RW'}-X_{KW'}) & (X_{GW'}-X_{KW'}) & (X_{BW'}-X_{KW'}) \\ (Y_{RW'}-Y_{KW'}) & (Y_{GW'}-Y_{KW'}) & (Y_{BW'}-Y_{KW'}) \\ (Z_{RW'}-Z_{KW'}) & (Z_{GW'}-Z_{KW'}) & (Z_{BW'}-Z_{KW'}) \end{bmatrix} \begin{bmatrix} R_{LC}(x,y) \\ G_{LC}(x,y) \\ B_{LC}(x,y) \end{bmatrix} + \begin{bmatrix} X_{KW'} \\ Y_{KW'} \\ Z_{KW'} \end{bmatrix} \quad (6)$$

$$\begin{bmatrix} R_{LC}(x,y) \\ G_{LC}(x,y) \\ B_{LC}(x,y) \end{bmatrix} = \begin{bmatrix} (X_{RW'}-X_{KW'}) & (X_{GW'}-X_{KW'}) & (X_{BW'}-X_{KW'}) \\ (Y_{RW'}-Y_{KW'}) & (Y_{GW'}-Y_{KW'}) & (Y_{BW'}-Y_{KW'}) \\ (Z_{RW'}-Z_{KW'}) & (Z_{GW'}-Z_{KW'}) & (Z_{BW'}-Z_{KW'}) \end{bmatrix}^{-1} \begin{bmatrix} X_{in}(x,y)-X_{KW'} \\ Y_{in}(x,y)-Y_{KW'} \\ Z_{in}(x,y)-Z_{KW'} \end{bmatrix} \quad (7)$$

When pixel values of the correction signal values $R_{LC}$(x, y), $G_{LC}$(x, y) and $B_{LC}$(x, y) are not within the range of zero (0) to one (1), the pixel values of the correction signal values $R_{LC}$(x, y), $G_{LC}$(x, y) and $B_{LC}$(x, y) are corrected according to Formula 8, so that correction signal values $R'_{LC}$(x, y), $G_{LC}$(x, y) and $B_{LC}$(x, y) are obtained.

$$R'_{LC}(x,y) = \begin{cases} 0(R_{LC}(x,y) < 0) \\ R_{LC}(x,y)(0 \le R_{LC}(x,y) \le 1) \\ 1(R_{LC}(x,y) > 1) \end{cases} \quad (8)$$

$$G'_{LC}(x,y) = \begin{cases} 0(G_{LC}(x,y) < 0) \\ G_{LC}(x,y)(0 \le G_{LC}(x,y) \le 1) \\ 1(G_{LC}(x,y) > 1) \end{cases}$$

-continued $$B'_{LC}(x,y) = \begin{cases} 0(B_{LC}(x,y) < 0) \\ B_{LC}(x,y)(0 \le B_{LC}(x,y) \le 1) \\ 1(B_{LC}(x,y) > 1) \end{cases}$$

In step S205, the error calculation unit 110 calculates the error 111 based on the corrected video signal 109 and the color-converted video signal 103. When the light sources emit lights at light source intensities $R_{BL}$, $G_{BL}$, $B_{BL}$ respectively and the pixel values of the correction signals $R_{LC}$(x, y), $G_{LC}$(x, y) and $B_{LC}$(x, y) are not within the range of zero (0) to one (1), tristimulus values X'(x, y), Y'(x, y) and Z'(x, y) of the lights displayed on the screen are calculated according to Formula 9. When the correction signal values $R_{LC}$(x, y), $G_{LC}$(x, y), $B_{LC}$(x, y) are all within the range of zero (0) to one (1), the error calculation unit 110 sets the error 111 to zero without calculating the tristimulus values X'(x, y), Y'(x, y) and Z'(x, y).

$$\begin{bmatrix} X'(x,y) \\ Y'(x,y) \\ Z'(x,y) \end{bmatrix} = \begin{bmatrix} X_{RW'} & X_{GW'} & X_{BW'} \\ Y_{RW'} & Y_{GW'} & Y_{BW'} \\ Z_{RW'} & Z_{GW'} & Z_{BW'} \end{bmatrix} \begin{bmatrix} R'_{LC}(x,y) \\ G'_{LC}(x,y) \\ B'_{LC}(x,y) \end{bmatrix} \quad (9)$$

Further, the error calculation unit 110 calculates errors respectively between the tristimulus values $X_{in}$(x, y), $Y_{in}$(x, y), $Z_{in}$(x, y) of the input video signal 103 and the tristimulus values (X'(x, y), Y'(x, y), Z'(x, y) which are actually displayed in a CIELAB space. The tristimulus values of the color-converted video signal 103 are tristimulus values of an ideal image. On the other hand, the tristimulus values actually displayed are tristimulus values of a display image. Specifically, the tristimulus values $X_{in}$(x, y), $Y_{in}$(x, y) and $Z_{in}$(x, y) and the tristimulus values (X'(x, y), Y'(x, y) and Z'(x, y)) are converted into values $L_{in}$(x, y), $a_{in}$(x, y), $b_{in}$(x, y) and values L'(x, y), a'(x, y), b'(x, y) of the CIELAB space according to Formula 10, respectively.

$$L_{in}(x,y) = 116 * \left(\frac{Y_{in}(x,y)}{Y_n}\right)^{\frac{1}{3}} - 16 \quad (10)$$

$$a_{in}(x,y) = 500 * \left\{\left(\frac{X_{in}(x,y)}{X_n}\right)^{\frac{1}{3}} - \left(\frac{Y_{in}(x,y)}{Y_n}\right)^{\frac{1}{3}}\right\}$$

$$b_{in}(x,y) = 200 * \left\{\left(\frac{Y_{in}(x,y)}{Y_n}\right)^{\frac{1}{3}} - \left(\frac{Z_{in}(x,y)}{Z_n}\right)^{\frac{1}{3}}\right\}$$

$$L'(x,y) = 116 * \left(\frac{Y'(x,y)}{Y_n}\right)^{\frac{1}{3}} - 16$$

$$a'(x,y) = 500 * \left\{\left(\frac{X'(x,y)}{X_n}\right)^{\frac{1}{3}} - \left(\frac{Y'(x,y)}{Y_n}\right)^{\frac{1}{3}}\right\}$$

$$b'(x,y) = 200 * \left\{\left(\frac{Y'(x,y)}{Y_n}\right)^{\frac{1}{3}} - \left(\frac{Z'(x,y)}{Z_n}\right)^{\frac{1}{3}}\right\}$$

$X_n$, $Y_n$ and $Z_n$ of Formula 10 represent tristimulus values obtained when the RGB light sources are turned on at a maximum output (when white light is emitted). Further, a display error ΔE(x, y) between the values $L_{in}$(x, y), $a_{in}$(x, y) and $b_{in}$(x, y) and the values L'(x, y), a'(x, y) and b'(x, y) is calculated according to Formula 11.

$$\Delta E(x, y) = \sqrt{(L_{in}(x, y) = L'(x, y))^2 + (a_{in}(x, y) - a'(x, y))^2 + (b_{in}(x, y) - b'(x, y))^2} \quad (11)$$

The display error ΔE(x, y) at coordinates (x, y) obtained when the light sources emit light at the light source intensities $R_{BL}$, $G_{BL}$, $B_{BL}$ is calculated as described above. The CIELAB space is an equivalent color space. The display error ΔE(x, y) represents a display error of brightness and a color. The error calculation unit 110 inputs a maximum value among the display errors ΔE(x, y) of all pixels within the screen, to the control unit 112, as the error 111 corresponding to the light source intensity information 105.

In the embodiment, as described above, the maximum value among the display errors ΔE(x, y) of all of the pixels within the screen is used as the error 111, but the sum or an average value of the display errors ΔE(x, y) may be used as the error 111. Further, in the embodiment, the error 111 is set based on the display errors ΔE(x, y) of all of the pixels within the screen, but the error 111 may be set based on the display errors ΔE(x, y) of some pixels extracted from all of the pixels within the screen.

The control unit 112 obtains a minimum value from among the errors relating to the plurality of pieces of light source intensity information 105 set by and sequentially outputted from the light source setting unit 104. The control unit 112 sets the light source intensity information 105 corresponding to the minimum value as the emission intensity information 113. The control unit 112 provides the obtained emission intensity information 113 to the light source control unit 115.

In step S206, to the liquid crystal control unit 114, the control unit 112 provides the corrected video signal 109*a* corresponding to the emission intensity information 113, among the corrected video signals 109 corresponding to the pieces of light source intensity information 105.

The corrected video signal 109*a* corresponding to the emission intensity information 113 is a corrected video signal the error of which is minimum. In step S207, the liquid crystal control unit 114 provides the liquid crystal control signal 116 to the liquid crystal panel, and displays the corrected video signal 109*a* on the display area of the liquid crystal panel 118. Further, the light source control unit 115 provides the light source control signal 117 to the backlight 119, and performs control such that light having intensity according to the emission intensity information 113 is irradiated from the backlight 119.

Figure 4A:
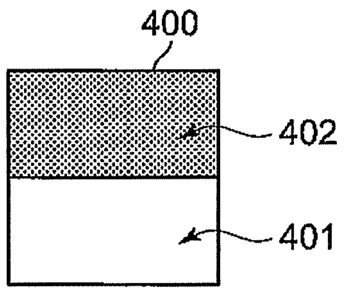
FIG. 4A illustrates an example of an input image.
Figure 4B:
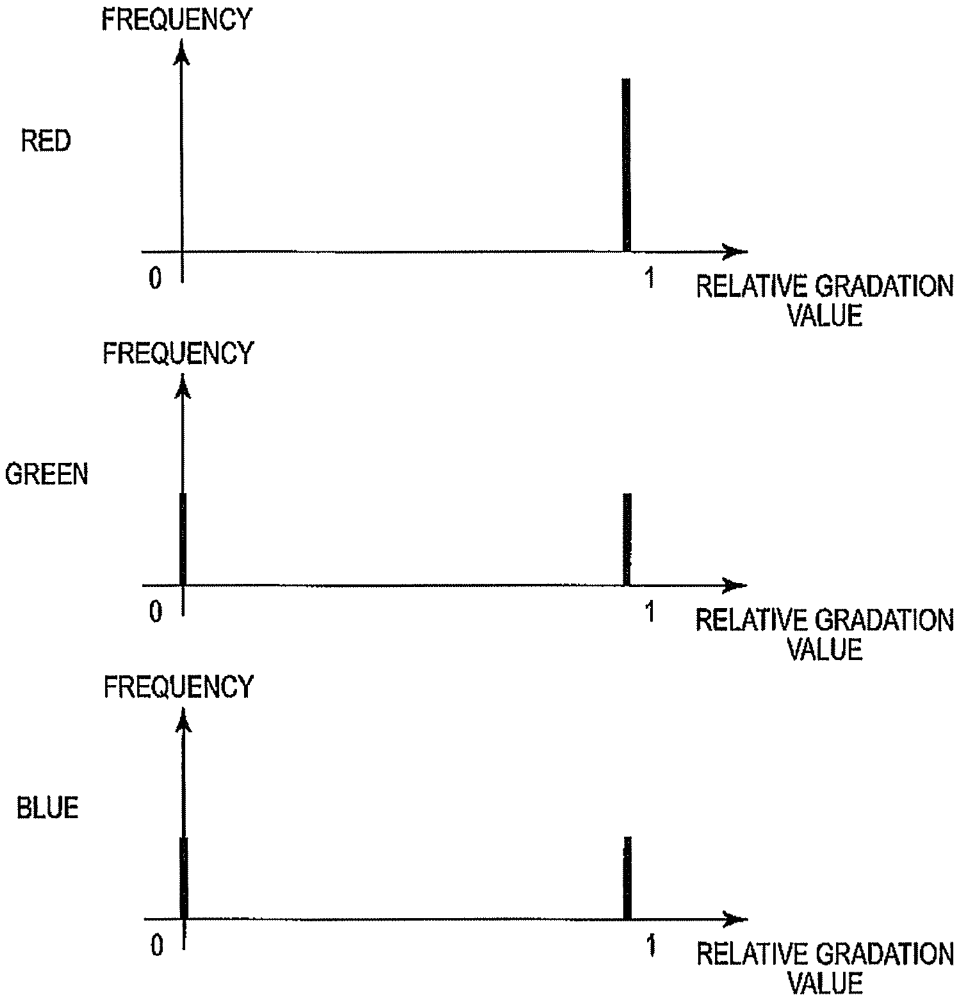
FIG. 4B is a histogram of a relative gradation value of an input image.
Figure 5A:
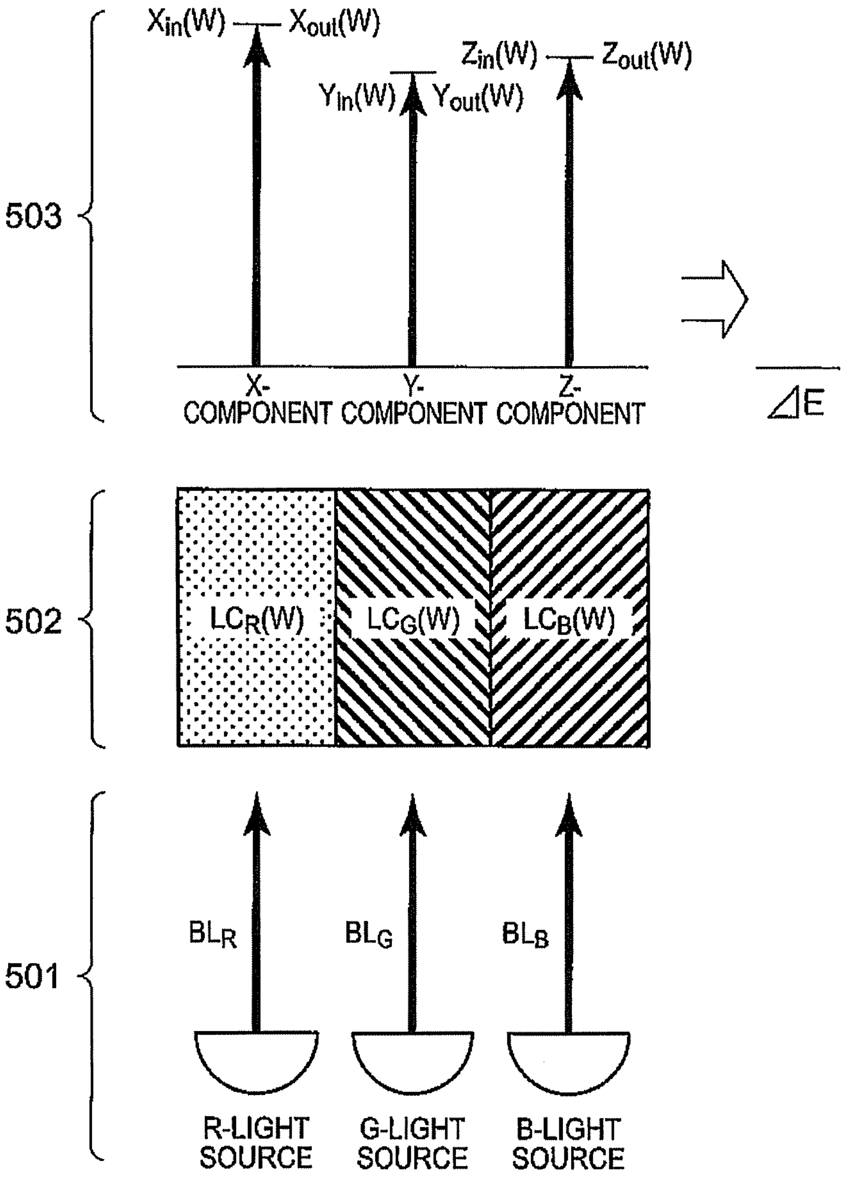
FIG. 5A is a schematic diagram for explaining a case where a white color is displayed in an LCD device according to a comparative example.
Figure 5B:
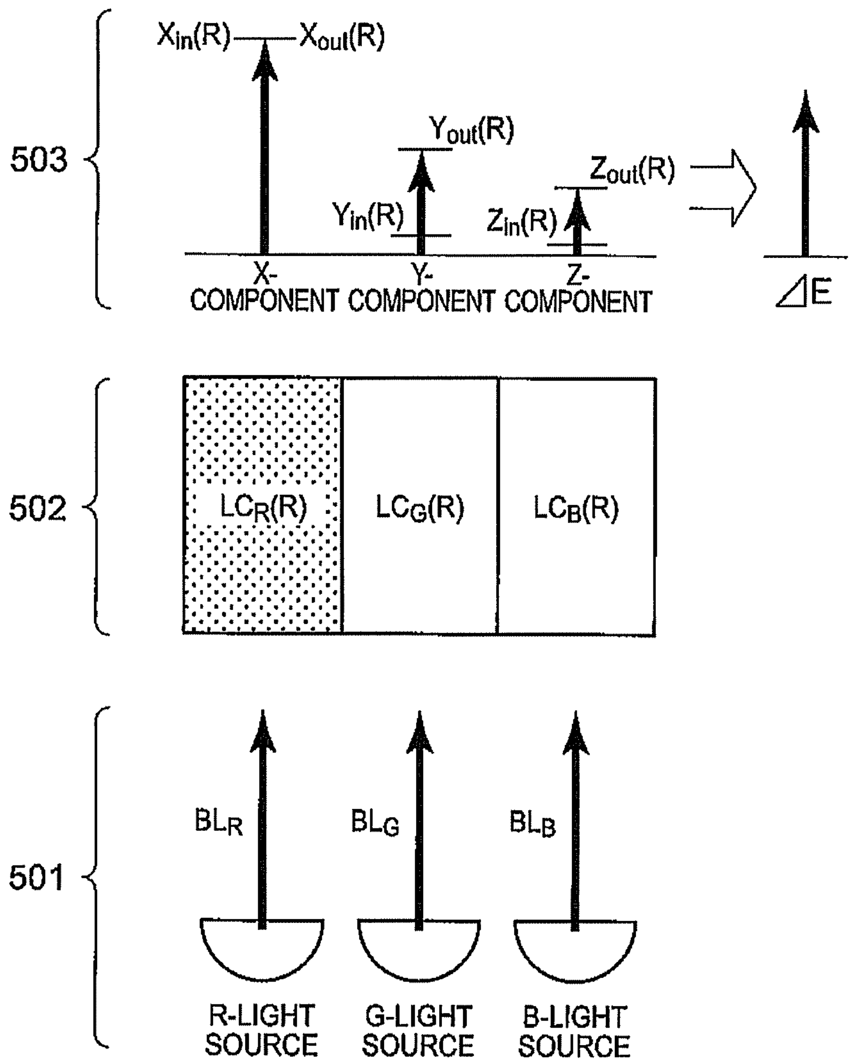
FIG. 5B is a schematic diagram for explaining a case where a red color is displayed in an LCD device according to a comparative example.
Figure 5C:
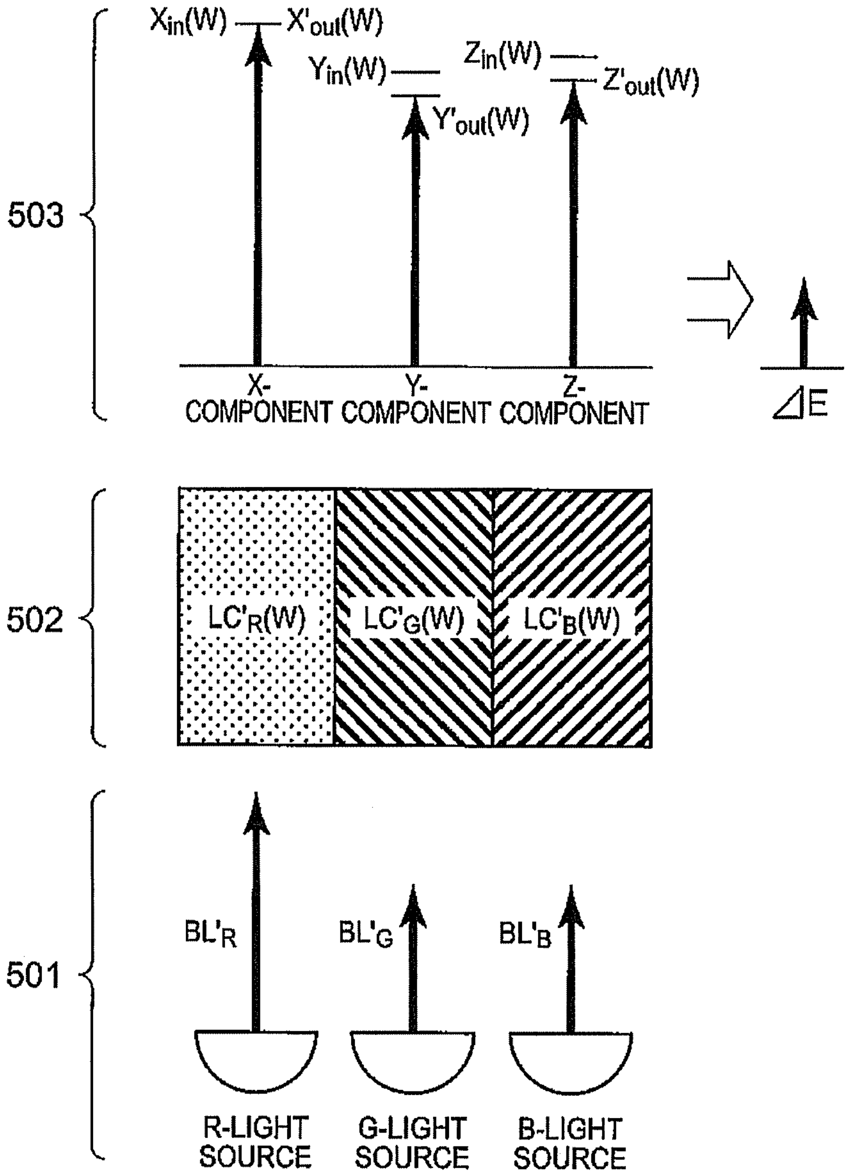
FIG. 5C is a schematic diagram for explaining a case where a white color is displayed in the LCD device according to the first embodiment.
Figure 5D:
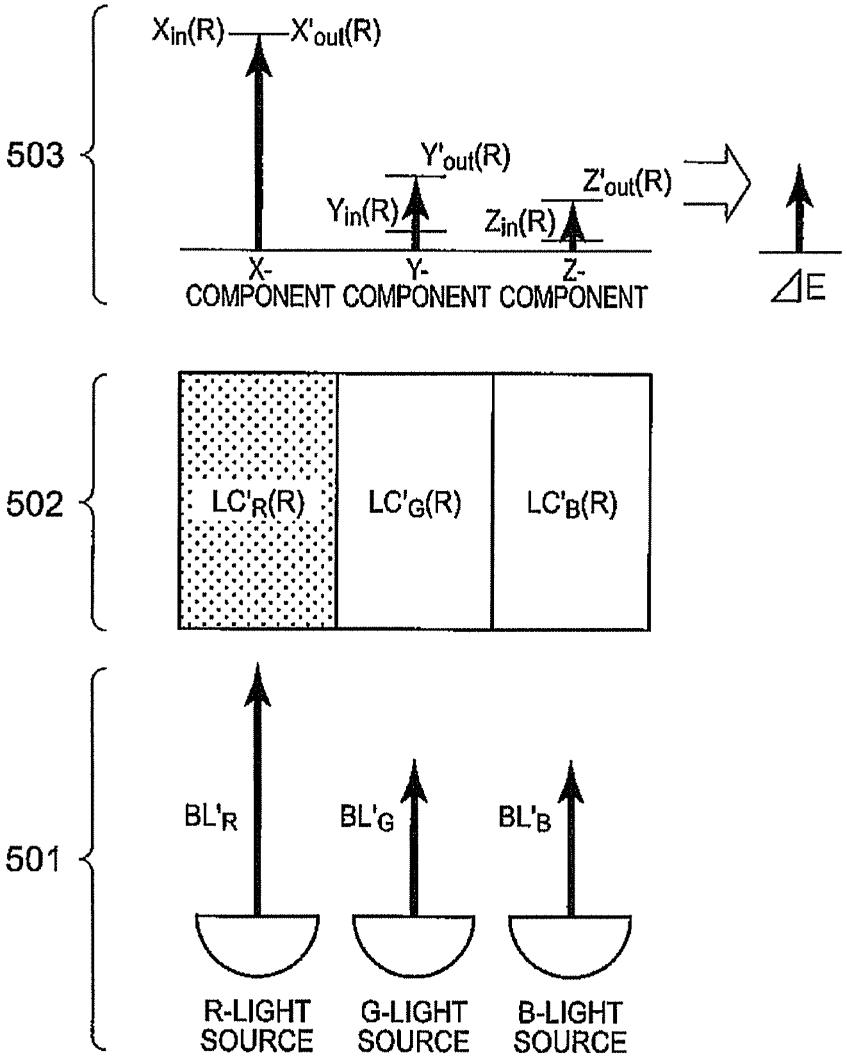
FIG. 5D is a schematic diagram for explaining a case where a red color is displayed in the LCD device according to the first embodiment.

FIG. 4A illustrates an example of an input image which is referred to in the following explanation. FIG. 4B is a histogram of a relative gradation value of the input image. FIGS. 5A and 5B are schematic diagrams to explain displaying by an LCD device according to a comparative example. FIGS. 5C and 5D are schematic diagrams to explain displaying according to the embodiment.

In FIG. 4A, the lower half of the input image 400 is a white color area 401, and the remaining upper half is a red color area 402. In FIG. 4B, the relative gradation value is a gradation value represented by a value between 0 and 1.0. In the input image 400 of FIG. 4A, the relative gradation value of the R component is 1.0 in all of the pixels. The relative gradation values of the G component and the B component are zero (0) in half of the pixels and 1.0 in the remaining half of the pixels.

In the comparative example, the light source intensities of R, G and B colors are set according to maximum values of the R, G, and B components of the input image, respectively. When the light source intensities are $BL_R$, $BL_G$ and $BL_B$, $BL_R$ is 1.0, $BL_G$ is 1.0, and $BL_B$ is 1.0.

FIG. 5A is a schematic diagram to be obtained when a white color is displayed by the LCD device according to the comparative example. FIG. 5B is a schematic diagram to be obtained when a red color is displayed by the LCD device according to the comparative example. The Lights having intensities according to light source intensities $BL_R$, $BL_G$ and $BL_B$ respectively are emitted from a light source unit 501, and passes through a liquid crystal panel 502. In FIGS. 5A, 5B, a graph 503 schematically represents magnitudes of intensity of light to be displayed and a display error ΔE, by upward arrows, respectively.

In a pixel displaying a white, assuming that the signal values provided to the liquid crystal panel 502 are denoted as $LC_R$(W), $LC_G$(W) and $LC_B$(W), $LC_R$(W) is set to 1.0, $LC_G$(W) is set to 1.0, and $LC_B$(W) is set to 1.0. The lights from the light sources pass through the pixel, so that an assumed white can be displayed.

In FIG. 5A, $X_{in}$(W), $Y_{in}$(W) and $Z_{in}$(W) are tristimulus values of a white color which is desired to be displayed, and $X_{out}$(W), $Y_{out}$(W) and $Z_{out}$(W) are tristimulus values of a white color which is displayed by the conventional technique. In FIG. 5B, $X_{in}$(R), $Y_{in}$(R) and $Z_{in}$(R) are tristimulus values of a red color which is desired to be displayed, and $X_{out}$(R), $Y_{out}$(R) and $Z_{out}$(R) are tristimulus values of a red color which is displayed by the conventional technique.

In a pixel displaying a red, assuming that light source intensities of the respective colors are $BL_R$=1.0, $BL_G$=1.0, and $BL_B$=1.0, signal values of the respective colors provided to the LC panel are set to $LC_R$(R)=1.0, $LC_G$(R)=0.0, and $LC_B$(R)=0.0. The red is displayed such that light of the G light source and light of the B light source are blocked by a liquid crystal cell. Even though the signal values of G and B of the liquid crystal panel are set to zero, light leaks from the G and B light sources so that the display error ΔE illustrated in FIG. 5B occurs actually. For this reason, in the actually displayed light, light of the G component and light of the B component increase so that the red looks whitish.

FIG. 5C is a schematic diagram to be obtained when a white color is displayed according to the embodiment. FIG. 5D is a schematic diagram to be obtained when a red color is displayed according to the embodiment. In the embodiment, the error calculation unit 110 presumes an error between the tristimulus values of the display image obtained when the light source intensity is set to a certain value and the tristimulus values of the ideal image, and sets the light source intensity so as to minimize the error.

Thus, when the input image 400 of FIG. 4A is inputted, as illustrated in FIGS. 5C and 5D, the light source intensities of the R, G and B colors are set so that the display error ΔE for displaying the red and the display error ΔE for display the white can have the same magnitude and be minimized.

As illustrated in FIGS. 5C and 5D, since the light intensities of G and B according to the embodiment are weaker than those of the conventional technique, as illustrated in FIGS. 5A and 5B. According to the embodiment, the display error of the white slightly occurs, but an error occurring when the red is displayed can be suppressed to a small value. Thus, an image close to an assumed color can be displayed as a whole. In FIGS. 5C and 5D, $X'_{out}$(W), $Y'_{out}$(W) and $Z'_{out}$(W) are tristimulus values of the white color displayed by the LCD device according to the embodiment, and $X'_{out}$(R), $Y'_{out}$(R) and $Z'_{out}$(R) are tristimulus values of the red color displayed by the LCD device according to the embodiment.

In the embodiment, the number of colors of light sources is not limited, and an image can be displayed with a minimum error between an image desired to be displayed and an actually displayed image.

A second embodiment will be described below. The basic configuration of an LCD device according to the second embodiment is same as that of the LCD device of FIG. 1.

Figure 6A:
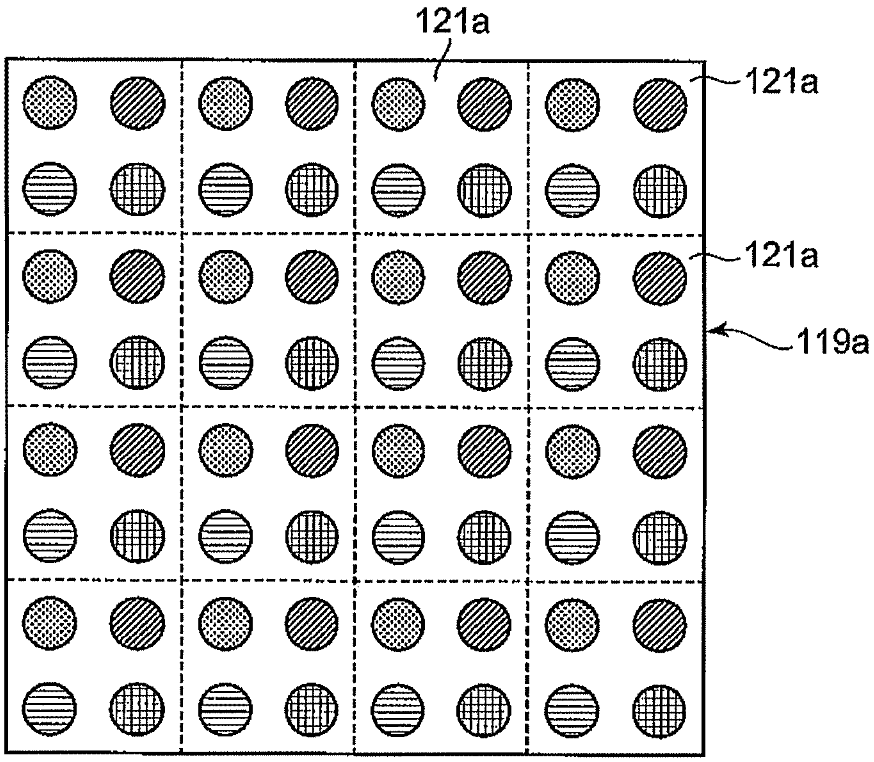
FIG. 6A is a schematic diagram of a backlight of an LCD device according to a second embodiment.
Figure 6B:
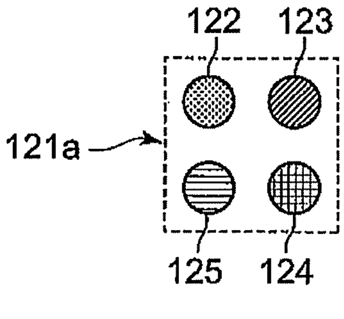
FIG. 6B is a schematic diagram of another unit light source.

FIG. 6A is a schematic diagram of a backlight 119*a* according to the second embodiment. The backlight 119*a* according to the second embodiment is provided with a plurality of light sources 121*a*. Each of the light sources 121*a* includes an R light source 122, a G light source 123, a B light source 124, and a Cy light source 125 (cyan), as a fourth light source, as illustrated in FIG. 6B. In the embodiment, a Cy light source 125 of a cyan color is employed as the fourth light source, but a light source of a color other than a cyan may be used as the fourth light source. Further, the number of colors of light sources may be five or more.

In the case of the second embodiment, in an LCD device 100 of FIG. 1, an intensity setting unit 104 sets light source intensity information 105 of R, G, B and Cy, and provides the light source intensity information 105 of R, G, B and Cy to an color presumption unit 106. In the same manner as in the first embodiment, the color presumption unit 106 presumes tristimulus values of a light obtained after a mixture of lights from the light sources of the respective colors passes through a liquid crystal panel. Specifically, in the embodiment, the tristimulus values of the mixture light are calculated by Formulae 12-1, 12-2 and 12-3.

Formula 12-1 is a formula for calculating tristimulus values of the transmitted light obtained when the mixture light is irradiated to an R pixel. Formula 12-2 is a formula for calculating tristimulus values of transmitted light obtained when the mixture light is irradiated to a G pixel. Formula 12-3 is a formula for calculating tristimulus values of transmitted light obtained when the mixture light is irradiated to a B pixel.

$$\begin{bmatrix} X_{RW'} \\ Y_{RW'} \\ Z_{RW'} \end{bmatrix} = \begin{bmatrix} X_{RR} & X_{RG} & X_{RB} & X_{RC} \\ Y_{RR} & Y_{RG} & Y_{RB} & Y_{RC} \\ Z_{RR} & Z_{RG} & Z_{RB} & Z_{RC} \end{bmatrix} \begin{bmatrix} R_{BL} \\ G_{BL} \\ B_{BL} \\ C_{BL} \end{bmatrix} \tag{12-1}$$

$$\begin{bmatrix} X_{GW'} \\ Y_{GW'} \\ Z_{GW'} \end{bmatrix} = \begin{bmatrix} X_{GR} & X_{GG} & X_{GB} & X_{GC} \\ Y_{GR} & Y_{GG} & Y_{GB} & Y_{GC} \\ Z_{GR} & Z_{GG} & Z_{GB} & Z_{GC} \end{bmatrix} \begin{bmatrix} R_{BL} \\ G_{BL} \\ B_{BL} \\ C_{BL} \end{bmatrix} \tag{12-2}$$

$$\begin{bmatrix} X_{BW'} \\ Y_{BW'} \\ Z_{BW'} \end{bmatrix} = \begin{bmatrix} X_{BR} & X_{BG} & X_{BB} & X_{BC} \\ Y_{BR} & Y_{BG} & Y_{BB} & Y_{BC} \\ Z_{BR} & Z_{BG} & Z_{BB} & Z_{BC} \end{bmatrix} \begin{bmatrix} R_{BL} \\ G_{BL} \\ B_{BL} \\ C_{BL} \end{bmatrix} \tag{12-3}$$

In Formulae 12-1, 12-2 and 12-3, $X_{RC}$ represents an X component of a light of the Cy light source passing through the R pixel, $Y_{RC}$ represents a Y component of a light of the Cy light source passing through the R pixel, and $Z_{RC}$ represents a Z component of a light of the Cy light source passing through the R pixel. The same notation is applied to the remaining components of the tristimulus values.

Then, a signal correction unit 108 of FIG. 1 obtains a corrected video signal 109 for displaying a color-converted video signal 103 when the mixture light corresponding to the transmitted light is irradiated to a liquid crystal panel 118, based on presumed color information 107 of the transmitted light. Specifically, correction signal values $R_{LC}(x, y)$, $G_{LC}(x, y)$, $B_{LC}(x, y)$ of the liquid crystal panel are calculated by Formula 13.

$$\begin{bmatrix} R_{LC}(x, y) \\ G_{LC}(x, y) \\ B_{LC}(x, y) \end{bmatrix} = \begin{bmatrix} X_{RW'} & X_{GW'} & X_{BW'} \\ Y_{RW'} & Y_{GW'} & Y_{BW'} \\ Z_{RW'} & Z_{GW'} & Z_{BW'} \end{bmatrix}^{-1} \begin{bmatrix} X_{in}(x, y) \\ Y_{in}(x, y) \\ Z_{in}(x, y) \end{bmatrix} \tag{13}$$

In Formulae 12-1, 12-2, 12-3 and 13, leakage of light from the light sources arising when black is displayed on the liquid crystal panel is not considered. Formula 14 and Formulae 6, 7 used in the first embodiment may be used for taking the light leakage into account. Specifically, tristimulus values $X_{KW'}$, $Y_{KW'}$, $Z_{KW'}$ of a light which are given when black is displayed on the liquid crystal panel are calculated according to Formula 14. Formula 6 represents a relation among the tristimulus values $X_{KW'}$, $Y_{KW'}$ and $Z_{KW'}$ which is obtained when black is displayed, tristimulus values $X_{in}(x, y)$, $Y_{in}(x, y)$ and $Z_{in}(x, y)$ of the input video, and correction signal values $R_{LC}(x, y)$, $G_{LC}(x, y)$ and $B_{LC}(x, y)$. The correction signal values $R_{LC}(x, y)$, $G_{LC}(x, y)$ and $B_{LC}(x, y)$ are calculated by Formula 7.

$$\begin{bmatrix} X_{KW'} \\ Y_{KW'} \\ Z_{KW'} \end{bmatrix} = \begin{bmatrix} X_{KR} & X_{KG} & X_{KB} & X_{KC} \\ Y_{KR} & Y_{KG} & Y_{KB} & Y_{KC} \\ Z_{KR} & Z_{KG} & Z_{KB} & Z_{KC} \end{bmatrix} \begin{bmatrix} R_{BL} \\ G_{BL} \\ B_{BL} \\ C_{BL} \end{bmatrix} \tag{14}$$

When the values of $R_{LC}(x, y)$, $G_{LC}(x, y)$ and $B_{LC}(x, y)$ are not within a range of zero (0) to one (1), the values $R_{LC}(x, y)$, $G_{LC}(x, y)$ and $B_{LC}(x, y)$ are corrected similarly to the first embodiment, so that values $R'_{LC}(x, y)$, $G'_{LC}(x, y)$ and $B'_{LC}(x, y)$ are obtained.

Further, similarly to the first embodiment, an error calculation unit 110 calculates an error 111 based on the corrected video signal 109 and the color-converted video signal 103. A control unit 112 sets the light source intensity information having a minimum error as emission intensity information 113, with reference to the pieces of light source intensity information 105 and the errors 111 corresponding to the pieces of light source intensity information 105. The pieces of light source intensity information 105 is obtained by combining pieces of light source intensity information of four colors and outputted from the light source setting unit 104 sequentially.

The control unit 112 provides the emission intensity information 113 to a light source control unit 115. Further, the control unit 112 provides a corrected video signal 109*a* corresponding to the emission intensity information 113, among the pieces of corrected video signals 109, to a liquid crystal control unit 114. The corrected video signal 109*a* corresponding to the emission intensity information 113 is a corrected video signal having the minimum error. The liquid crystal control unit 114 provides a liquid crystal control signal 116 to a liquid crystal panel 118, and displays the corrected video signal 109*a* on the display area of the liquid crystal panel 118. Further, the light source control unit 115 provides a light source control signal 117 to the backlight 119, and performs control such that a light having intensity according to the emission intensity information 113 is irradiated from the backlight 119.

According to the embodiment, since the light sources of four or more colors are used, the reproducible color reproduction gamut increases, and an image can be displayed with a minimum error between an image desired to be displayed and an actually displayed image.

A third embodiment will be described. The basic configuration of an LCD device according to the third embodiment is same as that of the LCD device of FIG. 1.

Figure 7A:
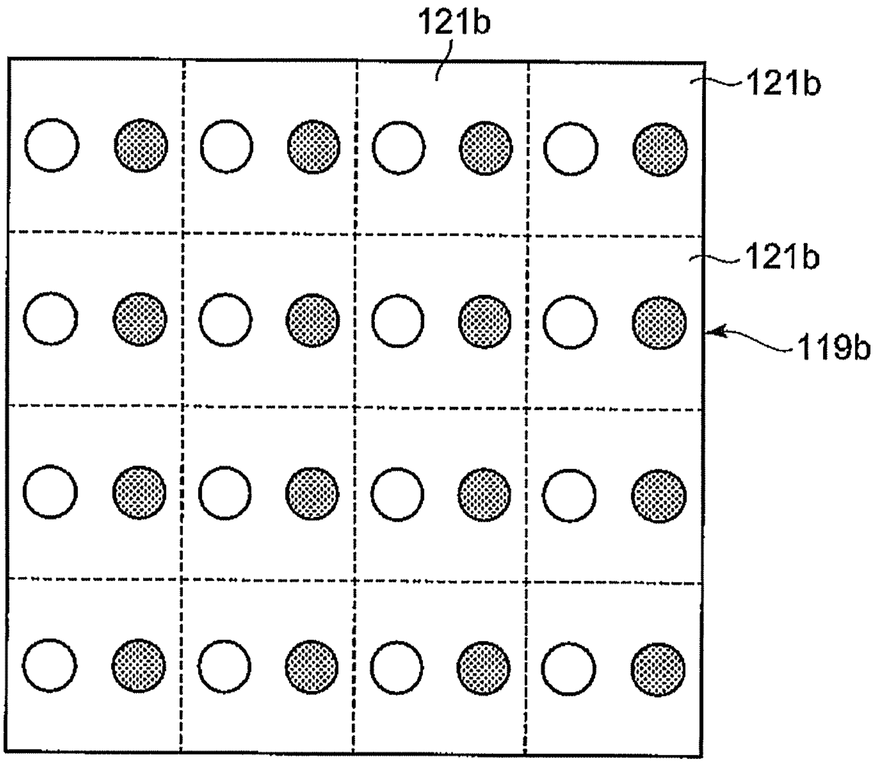
FIG. 7A is a schematic diagram of a backlight of an LCD device according to a third embodiment.
Figure 7B:
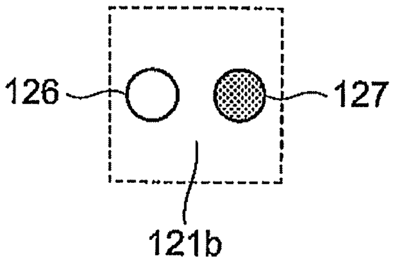
FIG. 7B is a schematic diagram of further another unit light source.

FIG. 7A is a schematic diagram of a backlight of the LCD device according to the third embodiment. In the third embodiment, each light source 121*b* of a backlight 119*b* is provided with two kinds of light sources, which are a first and a second white light sources 126, 127 as illustrated in FIG. 7B. The first and the second white light sources 126, 127 are two kinds of white LEDs having emission peaks at different wavelengths, respectively. The first and the second white light sources 126, 127 are not limited to the white LEDs so far as the light sources 126, 127 have emission peaks at different wavelengths.

Hereinafter, the first white light source 126 is defined as W1, and the second white light source 127 is defined as W2. In the third embodiment, an intensity setting unit 104 of FIG. 1 determines light source intensity information 105 of the first and second white light source W1, W2, and provides the light source intensity information 105 to a color presumption unit 106. The color presumption unit 106 presumes tristimulus values of a light obtained after a mixture of lights emitted from the two kinds of white light sources W1, W2 at intensities $W1_{BL}$, $W2_{BL}$ passes through a liquid crystal panel. In the third embodiment, the tristimulus values of the mixture light are calculated by the following Formulae 15-1, 15-2 and 15-3.

Formula 15-1 is a formula for obtaining tristimulus values of a transmitted light obtained when the mixture light is irradiated to an R pixel. Formula 15-2 is a formula for obtaining tristimulus values of a transmitted light obtained when the mixture light is irradiated to a G pixel. Formula 15-3 is a formula for obtaining tristimulus values of a transmitted light obtained when the mixture light is irradiated to a B pixel.

$$\begin{bmatrix} X_{RW'} \\ Y_{RW'} \\ Z_{RW'} \end{bmatrix} = \begin{bmatrix} X_{RW1} & X_{RW2} \\ Y_{RW1} & Y_{RW2} \\ Z_{RW1} & Z_{RW2} \end{bmatrix} \begin{bmatrix} W1_{BL} \\ W2_{BL} \end{bmatrix} \quad (15\text{-}1)$$

$$\begin{bmatrix} X_{GW'} \\ Y_{GW'} \\ Z_{GW'} \end{bmatrix} = \begin{bmatrix} X_{GW1} & X_{GW2} \\ Y_{GW1} & Y_{GW2} \\ Z_{GW1} & Z_{GW2} \end{bmatrix} \begin{bmatrix} W1_{BL} \\ W2_{BL} \end{bmatrix} \quad (15\text{-}2)$$

$$\begin{bmatrix} X_{BW'} \\ Y_{BW'} \\ Z_{BW'} \end{bmatrix} = \begin{bmatrix} X_{BW1} & X_{BW2} \\ Y_{BW1} & Y_{BW2} \\ Z_{BW1} & Z_{BW2} \end{bmatrix} \begin{bmatrix} W1_{BL} \\ W2_{BL} \end{bmatrix} \quad (15\text{-}3)$$

In Formulae 15-1, 15-2 and 15-3, $X_{RW1}$ represents an X component of a light of the light source W1 which passes through the R pixel. $Y_{RW1}$ represents a Y component of a light of the light source W1 which passes through the R pixel. $Z_{RW1}$ represents a Z component of a light of the light source W1 which passes through the R pixel. The same notation is applied to light components of the light source W2.

A signal correction unit 108 produces a corrected video signal 109 for displaying an input video signal 103 obtained when the mixture light corresponding to transmitted light is irradiated to a liquid crystal panel 118, based on color information 107 of the transmitted light. Specifically, correction signal values $R_{LC}(x, y)$, $G_{LC}(x, y)$ and $B_{LC}(x, y)$ of the liquid crystal panel are calculated by Formula 16.

$$\begin{bmatrix} R_{LC}(x, y) \\ G_{LC}(x, y) \\ B_{LC}(x, y) \end{bmatrix} = \begin{bmatrix} X_{RW'} & X_{GW'} & X_{BW'} \\ Y_{RW'} & Y_{GW'} & Y_{BW'} \\ Z_{RW'} & Z_{GW'} & Z_{BW'} \end{bmatrix}^{-1} \begin{bmatrix} X_{in}(x, y) \\ Y_{in}(x, y) \\ Z_{in}(x, y) \end{bmatrix} \quad (16)$$

In Formulae 15-1, 15-2, 15-3 and 16, leakage of light from the light sources arising when black is displayed on the liquid crystal panel is not considered. Formula 17 and Formulae 6, 7 used in the first embodiment may be used for taking the light leakage into account. Specifically, tristimulus values $X_{KW'}$, $Y_{KW'}$ and $Z_{KW'}$ of a light which are given when black is displayed on the liquid crystal panel is calculated according to Formula 17. The Formula 6 represents the relation among the tristimulus values $X_{KW'}$, $Y_{KW'}$ and $Z_{KW'}$ which is given when black is displayed, tristimulus values $X_{in}(x, y)$, $Y_{in}(x, y)$ and $Z_{in}(x, y)$ of the input video, and correction signal values $R_{LC}(x, y)$, $G_{LC}(x, y)$ and $B_{LC}(x, y)$. The correction signal values $R_{LC}(x, y)$, $G_{LC}(x, y)$ and $B_{LC}(x, y)$ are calculated by the Formula 7.

$$\begin{bmatrix} X_{KW'} \\ Y_{KW'} \\ Z_{KW'} \end{bmatrix} = \begin{bmatrix} X_{KW1} & X_{KW2} \\ Y_{KW1} & Y_{KW2} \\ Z_{KW1} & Z_{KW2} \end{bmatrix} \begin{bmatrix} W1_{BL} \\ W2_{BL} \end{bmatrix} \quad (17)$$

When the values $R_{LC}(x, y)$, $G_{LC}(x, y)$ and $B_{LC}(x, y)$ are not within a range of from zero (0) to one (1), the values $R_{LC}(x, y)$, $G_{LC}(x, y)$ and $B_{LC}(x, y)$ are corrected similarly to the first and second embodiments, so that values $R'_{LC}(x, y)$, $G'_{LC}(x, y)$ and $B'_{LC}(x, y)$ are obtained.

Further, similarly to the first and second embodiments, an error calculation unit 110 calculates an error 111 based on the corrected video signal 109 and the color-converted video signal 103. A control unit 112 sets light source intensity information having a minimum error as emission intensity information 113, with reference to the pieces of light source intensity information 105 and the errors corresponding to the pieces of light source intensity information 105. The pieces of light source intensity information 105 include intensity information of light sources for two colors, and are outputted sequentially from the light source setting unit 104.

The control unit 112 provides the emission intensity information 113 to a light source control unit 115. Further, the control unit 112 provides a corrected video signal 109*a* corresponding to the emission intensity information 113, among the pieces of corrected video signals 109, to a liquid crystal control unit 114. The liquid crystal control unit 114 provides a liquid crystal control signal 116 to the liquid crystal panel 118, and displays the corrected video signal 109*a* on the display area of the liquid crystal panel 118. The light source control unit 115 provides a light source control signal 117 to the backlight 119, and performs control such that the light having the intensity according to the emission intensity information 113 is irradiated from the backlight 119.

According to the third embodiment, since the light sources of two colors are used, the reproducible color reproduction gamut increases, and an image can be displayed with a minimum error between an image desired to be displayed and an actually displayed image.

Figure 8:
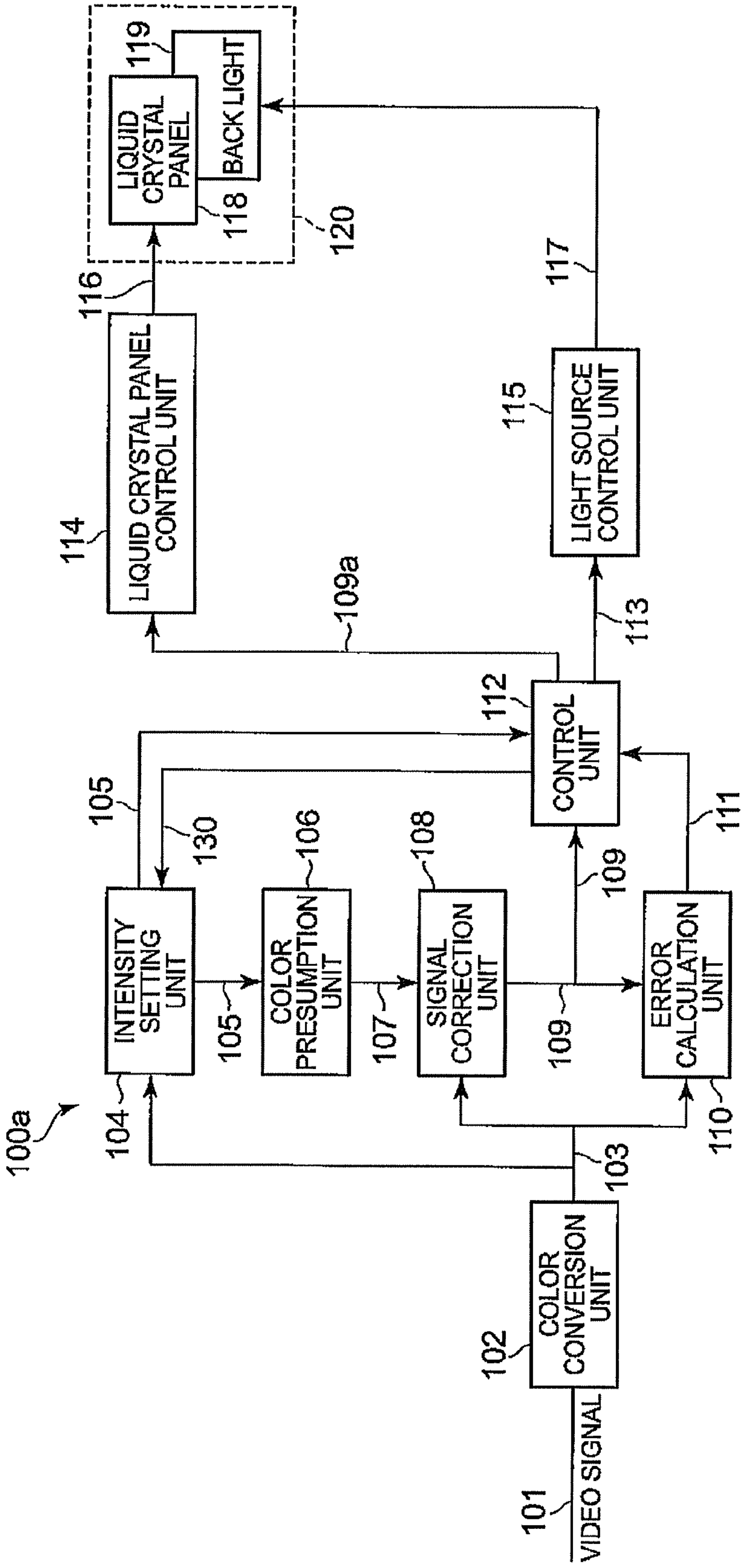
FIG. 8 is a block diagram of an LCD device according to a fourth embodiment.

A fourth embodiment will be described below. FIG. 8 is a block diagram of an LCD device 100*a* according to the fourth embodiment.

The basic configuration of an LCD device 100*a* according to the fourth embodiment is same as that of the first embodiment. The fourth embodiment is different from the first embodiment in the following point. In FIG. 8, an intensity setting unit 104 sets an initial value of light source intensity information 105 according to a color-converted video signal 103. In addition, the intensity setting unit 104 updates the light source intensity information 105 according to error information 130 inputted from a control unit 112 to the intensity setting unit 104.

The color-converted video signal 103 is inputted to a signal correction unit 108, an error calculation unit 110, and the intensity setting unit 104. The intensity setting unit 104 obtains the initial value of the light source intensity information 105 according to the video signal 103. In order to obtain light source intensities of respective colors based on the color-converted video signal, a plurality of kinds of methods may be used.

For example, when the number of light sources corresponds to three primary colors of R, G and B, a 3×3 color conversion matrix N as shown in Formula 18 may be prepared in advance. By Formula 18, maximum values $X_{max}$, $Y_{max}$ and $Z_{max}$ of the tristimulus values of all pixels within the screen are converted into light source intensities $R_{BL}$, $G_{BL}$ and $B_{BL}$.

$$\begin{bmatrix} R_{BL} \\ G_{BL} \\ B_{BL} \end{bmatrix} = N \begin{bmatrix} X_{max} \\ Y_{max} \\ Z_{max} \end{bmatrix} \quad (18)$$

Initial values of the light source intensity information 105 are inputted to a color presumption unit 106, similarly to the first embodiment. The color presumption unit 106 presumes the tristimulus values of a transmitted light. The signal correction unit 108 obtains a corrected video signal 109. The error calculation unit 110 calculates an error 111, and inputs the error 111 to the control unit 112. Similarly to the first embodiment, the error calculation unit 110 calculates display errors ΔE(x, y) for all pixels, and obtains a maximum value $\Delta E_{max}$ among the display errors ΔE(x, y). The error calculation unit 110 calculates $\Delta L_{max}$, $\Delta a_{max}$, and $\Delta b_{max}$ which are errors of the L, a and b components of a CIELAB space between a display image and an ideal image, with respect to a pixel whose display error ΔE(x, y) has the maximum value $\Delta E_{max}$.

The error calculation unit 110 inputs the maximum values $\Delta E_{max}$, $\Delta L_{max}$, $\Delta a_{max}$, and $\Delta b_{max}$ to the control unit 112, as the error 111. The sum or average of the values of each of ΔE(x, y), ΔL(x, y), Δa(x, y) and Δb(x, y) with respect to all pixels provided within a screen may be used as the error 111. In the fourth embodiment, the error 111 is set based on the display errors ΔE(x, y) of all of the pixels provided within the screen, but the error 111 may be set based on the display errors ΔE(x, y) of some pixels extracted from all of the pixels provided within the screen.

The control unit 112 compares the display error $\Delta E_{max}$ with a threshold value which is set advance. When the display error $\Delta E_{max}$ is smaller than the threshold value, the control unit 112 determines that the display error $\Delta E_{max}$ is significantly small.

When it is determined that the display error $\Delta E_{max}$ is significantly small, the control unit 112 inputs the light source intensity information 105 corresponding to the display error $\Delta E_{max}$ to a light source control unit 115, as emission intensity information 113, and inputs a corrected video signal 109*a* corresponding to the display error $\Delta E_{max}$ to a liquid crystal control unit 114.

When it is determined that the display error $\Delta E_{max}$ is not significantly small, the control unit 112 inputs the display errors $\Delta E_{max}$, $\Delta L_{max}$, $\Delta a_{max}$ and $\Delta b_{max}$ to the intensity setting unit 104, as the error information 130.

The intensity setting unit 104 updates the light source intensity information 105 based on stored light source intensity information and the error information 130, and then inputs the updated light source intensity information 105 to the color presumption unit 106.

The update processing of the light source intensity information 105 will be described in detail below. In the fourth embodiment, as described above, the control unit 112 inputs the display errors $\Delta E_{max}$, $\Delta L_{max}$, $\Delta a_{max}$ and $\Delta b_{max}$ of the L, a and b components of the CIELAB space between the display image and the ideal image, to the intensity setting unit 104, as the error information 130. The intensity setting unit 104 determines change amounts of the light source intensity information 105 of respective colors according to values of the display errors $\Delta E_{max}$, $\Delta L_{max}$, $\Delta a_{max}$ and $\Delta b_{max}$. Specifically, when the colors of the light sources are three primary colors of R, G and B, the change amounts $\Delta R_{max}$, $\Delta G_{max}$ and $\Delta B_{max}$ of intensities of R, G and B colors are calculated based on the display errors $\Delta E_{max}$, $\Delta L_{max}$, $\Delta a_{max}$ and $\Delta b_{max}$. The light source intensities are updated according to Formula 19. In Formula 19, $R_{BL}^i$, $G_{BL}^i$ and $B_{BL}^i$ are light source intensities respectively calculated by an i-th update, and the initial values are $R_{BL}^0$, $G_{BL}^0$ and $B_{BL}^0$.

$$R_{BL}^{i+1}=R_{BL}^{i}+\Delta R_{max}$$

$$G_{BL}^{i+1}=G_{BL}^{i}+\Delta G_{max}$$

$$B_{BL}^{i+1}=B_{BL}^{i}+\Delta B_{max} \quad (19)$$

ΔR, ΔG and ΔB which can reduce $\Delta E_{max}$ most efficiently can be obtained, and the obtained ΔR, ΔG, ΔB are set as the change amounts $\Delta R_{max}$, $\Delta G_{max}$ and $\Delta B_{max}$ respectively.

Alternately, $\Delta R_{max}$, $\Delta G_{max}$ and $\Delta B_{max}$ may be determined as follows. The largest value among $|\Delta L_{max}|$, $|\Delta a_{max}|$ and $|\Delta b_{max}|$ which are absolute values of $\Delta L_{max}$, $\Delta a_{max}$ and $\Delta b_{max}$ is obtained. When $|\Delta L_{max}|$ among the absolute values is the largest value, ΔR, ΔG, ΔB capable of most efficiently reducing $\Delta L_{max}$ are determined as the change amounts $\Delta R_{max}$, $\Delta G_{max}$ and $\Delta B_{max}$. When $|\Delta a_{max}|$ is the largest value, ΔR, ΔG, ΔB capable of most efficiently reducing $\Delta a_{max}$ are determined as the change amounts $\Delta R_{max}$, $\Delta G_{max}$ and $\Delta B_{max}$. When $|\Delta b_{max}|$ is the largest value, ΔR, ΔG, ΔB capable of most efficiently reducing $\Delta b_{max}$ are determined as the change amounts $\Delta R_{max}$, $\Delta G_{max}$ and $\Delta B_{max}$.

The change amounts $\Delta R_{max}$, $\Delta G_{max}$ and $\Delta B_{max}$ may be obtained by calculation. A relation between $\Delta L_{max}$, $\Delta a_{max}$, $\Delta b_{max}$ and $\Delta R_{max}$, $\Delta G_{max}$, $\Delta B_{max}$ may be stored in a look-up table in advance, and $\Delta R_{max}$, $\Delta G_{max}$ and $\Delta B_{max}$ may be obtained with reference to the look-up table.

The values of the display errors $\Delta L_{max}$, $\Delta a_{max}$ and $\Delta b_{max}$ reflect excess or shortage of light source intensity of each color. For example, when the light source intensity of the R component is insufficient, the values of the display errors $\Delta L_{max}$, $\Delta a_{max}$ and $\Delta b_{max}$ are associated with a change amount ΔR of a positive value. On the other hand, when the light source intensity of the R component is excessive, the values of the display errors $\Delta L_{max}$, $\Delta a_{max}$ and $\Delta b_{max}$ are associated with a change amount ΔR of a negative value. This is similarly applied even when the number of light sources is not three that is necessary to produce three colors.

In the embodiment, a backlight capable of modulating intensity of the light which is emitted through the whole surface collectively is used as the backlight 119. Further, $\Delta E_{max}$ is calculated for all pixels provided within the screen, and the light source intensity of the backlight is updated.

Another backlight may be used. The backlight is capable of controlling light source intensity of each color, independently for each of a plurality of illumination areas obtained by dividing the screen. In this case, $\Delta E_{max}$ can be calculated for each illumination area, and the light source intensity can be updated for each illumination area.

The color presumption unit 106, the signal correction unit 108, the error calculation unit 110 and the control unit 112 respectively shown in FIG. 8 perform the above described processing based on the updated light source intensity information 105. The update processing is repeated until the control unit 112 determines that the display error $\Delta E_{max}$ is sufficiently small. When the number of update times previously set is reached, the control unit 112 may determines the lastly updated light source intensity information 105 as the emission intensity information 113.

The liquid crystal control unit 114 provides a liquid crystal control signal 116 to the liquid crystal panel, and displays a corrected video signal 109*a* on the display area of a liquid crystal panel 118. Further, the light source control unit 115 provides a light source control signal 117 to a backlight 119, and performs control such that the light having intensity according to the emission intensity information 113 is irradiated from the backlight 119.

As described above, according to the embodiment, an image can be displayed with a minimum error between an image desired to be displayed and an actually displayed image, at a small number of calculation times without calculating and evaluating the errors by an enormous number of intensity combinations.

Figure 9:
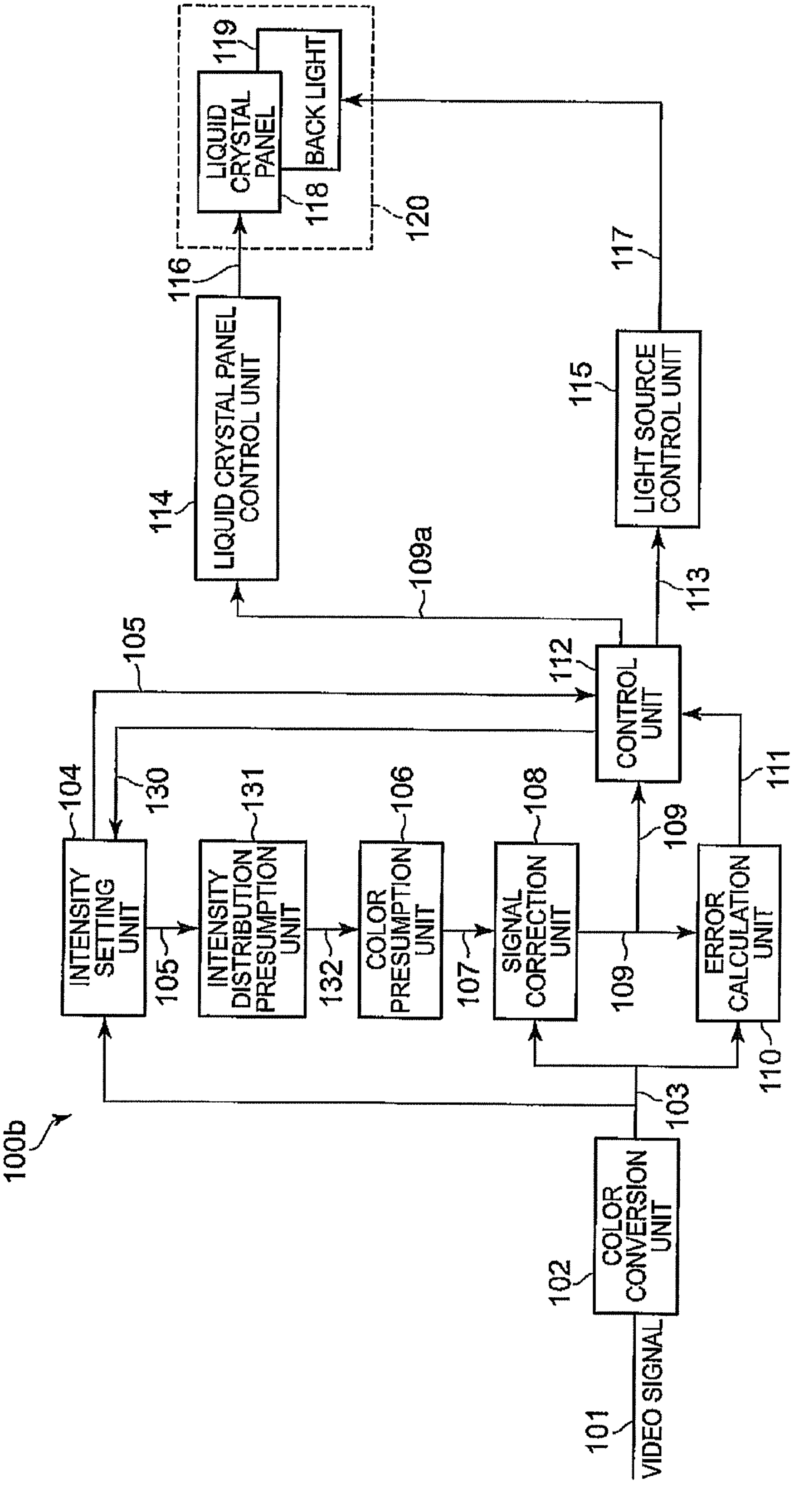
FIG. 9 is a block diagram of an LCD device according to a fifth embodiment.

FIG. 9 is a block diagram of an LCD device according to a fifth embodiment. In an LCD device 100*b* of the embodiment, in addition to the configuration of the first embodiment, a backlight 119 is provided with light sources of a plurality of colors which are capable of controlling light source intensities of respective colors, independently for each of a plurality of areas. The areas are obtained by dividing a screen and have different emission peak wavelengths. Further, in the LCD device 100*b*, an intensity distribution presumption unit 131 is provided. The unit 131 presumes a spatial distribution of light source intensity, based on light source intensity information 105. The following example shows a case where the light sources emit three colors of R, G and B, but the number of colors of the light sources is not limited to three.

The backlight 119 of the embodiment has a basic configuration same as that of the backlight of the first embodiment which is described above with reference to FIGS. 2A and 2B. The backlight 119 of the embodiment can individually control intensities of an R light source 122, a G light source 123, and a B light source 124 for each light source 121 illustrated in FIG. 2B. An illumination area of each of the light sources 121 is a portion of a display area of a liquid crystal panel 118 and corresponds to any one of areas obtained by virtually dividing the display area of the liquid crystal panel 118. The illumination area of each of the light sources 121 is decided based on a spatial arrangement of the light sources 121 on the backlight 119.

An illumination area of a video image to be displayed in the vicinity of an arrangement position of each light source 121 is decided for each light source 121 in advance. In FIG. 9, an intensity setting unit 104 sets the light source intensity information 105 of R, G and B for each illumination area, and provides the light source intensity information 105 to the intensity distribution presumption unit 131.

The intensity distribution calculation unit 131 calculates an intensity distribution information 132 of a light irradiated to the liquid crystal panel 118 from the backlight 119, according to the light source intensity information 105 for each of the colors of the light sources. Specifically, a convolution operation represented by Formula 20 is performed using the light source intensity information 105 of each illumination area and the previously obtained light source intensity distribution of each color of the light sources, so that the intensity distribution information 132 of the light source at a position (x, y) is obtained.

$$R_d(x, y) = \sum_{j=0}^{N-1}\sum_{i=0}^{M-1} P_R(i, j)\cdot R_{BL}\left(x - \frac{(M-1)}{2} + i,\ y - \frac{(N-1)}{2} + j\right) \quad (20)$$

$$G_d(x, y) = \sum_{j=0}^{N-1}\sum_{i=0}^{M-1} P_G(i, j)\cdot G_{BL}\left(x - \frac{(M-1)}{2} + i,\ y - \frac{(N-1)}{2} + j\right)$$

$$B_d(x, y) = \sum_{j=0}^{N-1}\sum_{i=0}^{M-1} P_B(i, j)\cdot B_{BL}\left(x - \frac{(M-1)}{2} + i,\ y - \frac{(N-1)}{2} + j\right)$$

In Formula 20, $R_d(x, y)$ represents an intensity distribution of a light of an R light source 122. $G_d(x, y)$ represents an intensity distribution of a light of the G light source 123. $B_d(x, y)$ represents an intensity distribution of a light of the B light source 124. M and N represent an odd number representing the size of the emission intensity distribution in a horizontal direction and an odd number representing the size of the emission intensity distribution in a vertical direction, respectively. $R_{BL}(x, y)$, $G_{BL}(x, y)$ and $B_{BL}(x, y)$ represent light source intensities of the R light source 122, the G light source 123 and the B light source 124 in the illumination area including coordinates (x, y), respectively. $P_R(i, j)$, $P_G(i, j)$ and $P_B(i, j)$ represent intensities of the emission intensity distribution of R, G and B at a position (i, j), respectively.

Figure 10:
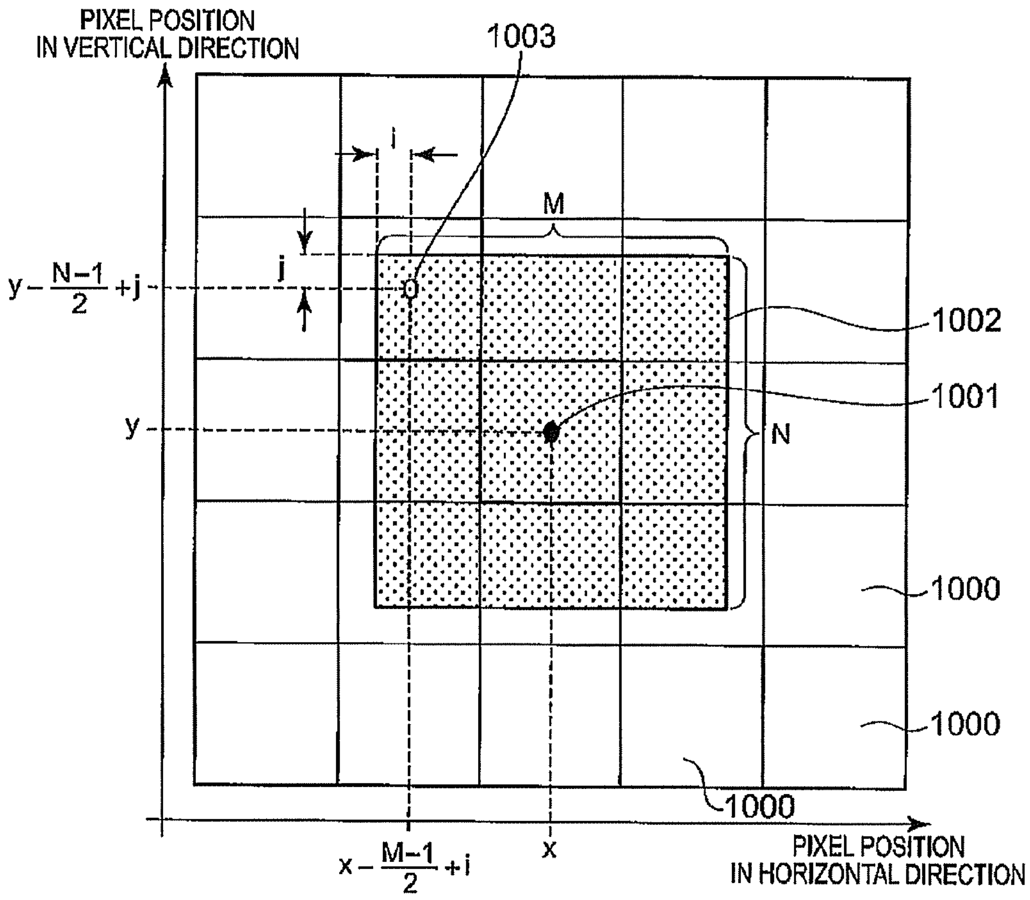
FIG. 10 is a conceptual diagram for explaining a convolution operation of the LCD device according to the fifth embodiment.

An example of the convolution operation will be described with reference to FIG. 10. A plurality of illumination areas 1000 is set on an image. A black circle 1001 is positioned at a pixel position of the coordinates (x, y), which is a position of a target pixel whose intensities distributions $R_d(x, y)$, $G_d(x, y)$ and $B_d(x, y)$ are to be calculated. An emission intensity distribution area 1002 is a rectangular area of M×N pixels. A white circle 1003 is positioned at the relative coordinates (i, j) within the emission intensity distribution area 1002, and is positioned at (x−(M−1)/2+i, y−(N−1)/2+j), as coordinates of a pixel of an image. As for an area corresponding to a contour portion of the image, the convolution operation of Formula 20 is performed using the information of light source intensity obtained by specular-reflecting light corresponding to the light source intensity information 105. As a result, $R_d(x, y)$, $G_d(x, y)$ and $B_d(x, y)$ which are the intensity distribution information 132 are obtained.

The intensity distribution information 132 calculated by the intensity distribution calculation unit 131 is inputted to a color presumption unit 106. In the embodiment, the intensity distributions of all pixel positions are calculated. However, as a simplified configuration of the embodiment, the intensity distribution may be presumed by assuming that the lights having the same intensities as the emission intensities of the light sources for each illumination area is irradiated to the respective pixels provided within each illumination area. Specifically, the intensity distribution may be presumed by Formula 21. In Formula 21, for example, $R_{BL}(x, y)$ is the light source intensity of the R light source 122 for the illumination area including the coordinates (x, y).

$$R_d(x,y)=R_{BL}(x,y)$$

$$G_d(x,y)=G_{BL}(x,y)$$

$$B_d(x,y)=B_{BL}(x,y) \tag{21}$$

Then, the color presumption unit 106 presumes the tristimulus values of the light which is obtained after a mixture of lights from the light sources of the respective colors irradiated to each pixel position of a liquid crystal panel passes through the liquid crystal panel. In the embodiment, the tristimulus values of the mixture light at the coordinates (x, y) are calculated by Formulae 22-1, 22-2 and 22-3 based on the intensities $R_d$(x, y), $G_d$(x, y) and $B_d$(x, y) at the coordinates (x, y).

Formula 22-1 is a formula for obtaining tristimulus values of the transmitted light when the mixture light is irradiated to the R pixel. Formula 22-2 is a formula for obtaining tristimulus values of the transmitted light when the mixture light is irradiated to the G pixel. Formula 22-3 is a formula for obtaining tristimulus values of the transmitted light when the mixture light is irradiated to the B pixel.

$$\begin{bmatrix} X_{RW'}(x,y) \\ Y_{RW'}(x,y) \\ Z_{RW'}(x,y) \end{bmatrix} = \begin{bmatrix} X_{RR} & X_{RG} & X_{RB} \\ Y_{RR} & Y_{RG} & Y_{RB} \\ Z_{RR} & Z_{RG} & Z_{RB} \end{bmatrix} \begin{bmatrix} R_d(x,y) \\ G_d(x,y) \\ B_d(x,y) \end{bmatrix} \tag{22-1}$$

$$\begin{bmatrix} X_{GW'}(x,y) \\ Y_{GW'}(x,y) \\ Z_{GW'}(x,y) \end{bmatrix} = \begin{bmatrix} X_{GR} & X_{GG} & X_{GB} \\ Y_{GR} & Y_{GG} & Y_{GB} \\ Z_{GR} & Z_{GG} & Z_{GB} \end{bmatrix} \begin{bmatrix} R_d(x,y) \\ G_d(x,y) \\ B_d(x,y) \end{bmatrix} \tag{22-2}$$

$$\begin{bmatrix} X_{BW'}(x,y) \\ Y_{BW'}(x,y) \\ Z_{BW'}(x,y) \end{bmatrix} = \begin{bmatrix} X_{BR} & X_{BG} & X_{BB} \\ Y_{BR} & Y_{BG} & Y_{BB} \\ Z_{BR} & Z_{BG} & Z_{BB} \end{bmatrix} \begin{bmatrix} R_d(x,y) \\ G_d(x,y) \\ B_d(x,y) \end{bmatrix} \tag{22-3}$$

In the Formulae 22-1, 22-2 and 22-3, for example, $X_{RG}$ represents an X component of light of the G light source passing through the R pixel. $Y_{RG}$ represents a Y component of light of the G light source passing through the R pixel. $Z_{RG}$ represents a Z component of light of the G light source passing through the R pixel. The same notation is applied to the remaining components of the tristimulus values.

A signal correction unit 108 obtains a corrected video signal 109 for displaying a video image to be formed by an input video signal 103 under irradiation of the mixture light, and inputs the obtained corrected video signal 109 to an error calculation unit 110. Specifically, the correction signal values $R_{LC}$(x, y), $G_{LC}$(x, y) and $B_{LC}$(x, y) of the liquid crystal panel are calculated by Formula 23.

$$\begin{bmatrix} R_{LC}(x,y) \\ G_{LC}(x,y) \\ B_{LC}(x,y) \end{bmatrix} = \begin{bmatrix} X_{RW'}(x,y) & X_{GW'}(x,y) & X_{BW'}(x,y) \\ Y_{RW'}(x,y) & Y_{GW'}(x,y) & Y_{BW'}(x,y) \\ Z_{RW'}(x,y) & Z_{GW'}(x,y) & Z_{BW'}(x,y) \end{bmatrix}^{-1} \begin{bmatrix} X_{in}(x,y) \\ Y_{in}(x,y) \\ Z_{in}(x,y) \end{bmatrix} \tag{23}$$

In the Formulae 22-1, 22-2, 22-3 and 23, leakage of light from the light sources arising when black is displayed on the liquid crystal panel is not considered. Formula 24 and the Formulae 6, 7 used in the first embodiment may be used for taking the light leakage into account. Tristimulus values $X_{KW'}$, $Y_{KW'}$ and $Z_{KW'}$ of a light to be given when black is displayed on the liquid crystal panel are obtained according to Formula 24. Formula 6 represents a relation among the tristimulus values $X_{KW'}$, $Y_{KW'}$ and $Z_{KW'}$, to be given when black is displayed, tristimulus values $X_{in}$(x, y), $Y_{in}$(x, y) and $Z_{in}$(x, y) of the input video, and the correction signal values $R_{LC}$(x, y), $G_{LC}$(x, y), $B_{LC}$(x, y). The correction signal values $R_{LC}$(x, y), $G_{LC}$(x, y), $B_{LC}$(x, y) are calculated by the Formula 7.

$$\begin{bmatrix} X_{KW'}(x,y) \\ Y_{KW'}(x,y) \\ Z_{KW'}(x,y) \end{bmatrix} = \begin{bmatrix} X_{KR} & X_{KG} & X_{KB} \\ Y_{KR} & Y_{KG} & Y_{KB} \\ Z_{KR} & Z_{KG} & Z_{KB} \end{bmatrix} \begin{bmatrix} R_d(x,y) \\ G_d(x,y) \\ B_d(x,y) \end{bmatrix} \tag{24}$$

When the values of $R_{LC}$(x, y), $G_{LC}$(x, y) and $B_{LC}$(x, y) are not within a range from zero (0) to one (1), the values of $R_{LC}$(x, y), $G_{LC}$(x, y) and $B_{LC}$(x, y) are corrected similarly to the first and second embodiments, so that $R'_{LC}$(x, y), $G'_{LC}$(x, y) and $B'_{LC}$(x, y) are obtained.

Then, the error calculation unit 110 calculates an error 111 based on the corrected video signal 109 and the color-converted video signal 103. When the correction signal values $R_{LC}$(x, y), $G_{LC}$(x, y), $B_{LC}$(x, y) at the coordinates (x, y) are not within in the range from zero (0) to one (1), tristimulus values X'(x, y), Y'(x, y) and Z'(x, y) of a light displayed on the screen are calculated by Formula 25. When all of the correction signal values $R_{LC}$(x, y), $G_{LC}$(x, y) and $B_{LC}$(x, y) are within the range from zero (0) to one (1), X'(x, y), Y'(x, y) and Z'(x, y) are not calculated, and the error 111 is set to zero.

$$\begin{bmatrix} X'(x,y) \\ Y'(x,y) \\ Z'(x,y) \end{bmatrix} = \begin{bmatrix} X_{RW'}(x,y) & X_{GW'}(x,y) & X_{BW'}(x,y) \\ Y_{RW'}(x,y) & Y_{GW'}(x,y) & Y_{BW'}(x,y) \\ Z_{RW'}(x,y) & Z_{GW'}(x,y) & Z_{BW'}(x,y) \end{bmatrix} \begin{bmatrix} R'_{LC}(x,y) \\ G'_{LC}(x,y) \\ B'_{LC}(x,y) \end{bmatrix} \tag{25}$$

The error between the ideal image and the display image is obtained as follows. An error between the tristimulus values $X_{in}$(x, y), $Y_{in}$(x, y) and $Z_{in}$(x, y) of the color-converted video signal 103 at the coordinates (x, y) and the actually displayed tristimulus values X'(x, y), Y'(x, y) and Z'(x, y) is calculated in the CIELAB space. Specifically, $X_{in}$(x, y), $Y_{in}$(x, y), $Z_{in}$(x, y) and X'(x, y), Y'(x, y), Z'(x, y) are converted into $L_{in}$(x, y), $a_{in}$(x, y), $b_{in}$(x, y) and L'(x, y), a'(x, y), b'(x, y) of the CIELAB space, respectively, by Formula 26.

$$L_{in}(x,y) = 116*\left(\frac{Y_{in}(x,y)}{Y_n}\right)^{\frac{1}{3}} - 16 \tag{26}$$

$$a_{in}(x,y) = 500*\left\{\left(\frac{X_{in}(x,y)}{X_n}\right)^{\frac{1}{3}} - \left(\frac{Y_{in}(x,y)}{Y_n}\right)^{\frac{1}{3}}\right\}$$

$$b_{in}(x,y) = 200*\left\{\left(\frac{Y_{in}(x,y)}{Y_n}\right)^{\frac{1}{3}} - \left(\frac{Z_{in}(x,y)}{Z_n}\right)^{\frac{1}{3}}\right\}$$

$$L'(x,y) = 116*\left(\frac{Y'(x,y)}{Y_n}\right)^{\frac{1}{3}} - 16$$

$$a'(x,y) = 500*\left\{\left(\frac{X'(x,y)}{X_n}\right)^{\frac{1}{3}} - \left(\frac{Y'(x,y)}{Y_n}\right)^{\frac{1}{3}}\right\}$$

$$b'(x,y) = 200*\left\{\left(\frac{Y'(x,y)}{Y_n}\right)^{\frac{1}{3}} - \left(\frac{Z'(x,y)}{Z_n}\right)^{\frac{1}{3}}\right\}$$

In Formula 26, $X_n$, $Y_n$ and $Z_n$ represent the tristimulus values to be given when the R, G and B light sources emit light at a maximum output (in a case where a white light is emitted). Further, the display error $\Delta E(x, y)$ between the values $L_{in}(x, y)$, $a_{in}(x, y)$ and $b_{in}(x, y)$ and the values $L'(x, y)$, $a'(x, y)$ and $b'(x, y)$ is calculated by Formula 27.

$$\Delta E(x, y) = \sqrt{\begin{array}{l}(L_{in}(x, y) - L'(x, y))^2 + \\ (a_{in}(x, y) - a'(x, y))^2 + \\ (b_{in}(x, y) - b'(x, y))^2\end{array}} \quad (27)$$

The display errors $\Delta L(x, y)$, $\Delta a(x, y)$ and $\Delta b(x, y)$ of L, a and b components are calculated by Formula 28, respectively.

$$\Delta L(x,y)=L_{in}(x,y)-L'(x,y)$$

$$\Delta a(x,y)=a_{in}(x,y)-a'(x,y)$$

$$\Delta b(x,y)=b_{in}(x,y)-b'(x,y) \quad (28)$$

The error calculation unit 110 obtains the largest value $\Delta E_{max}$ among the display errors $\Delta E(x, y)$ of all pixels provided within the screen. The error calculation unit 110 obtains $\Delta L_{max}$, $\Delta a_{max}$ and $\Delta b_{max}$ which are the errors of the "L" component, the "a" component, and the "b" component of the pixel whose display error $\Delta E$ is the largest value $\Delta E_{max}$. The error calculation unit 110 inputs $\Delta E_{max}$, $\Delta L_{max}$, $\Delta a_{max}$ and $\Delta b_{max}$ to a control unit 112, as the error 111 corresponding to the light source intensity information 105.

In the embodiment, $\Delta E(x, y)$, $\Delta L(x, y)$, $\Delta a(x, y)$ and $\Delta b(x, y)$ of the pixel whose display error $\Delta E(x, y)$ is the largest value are used as the error 111. Alternately, the total sum or the average of the respective values $\Delta E(x, y)$, $\Delta L(x, y)$, $\Delta a(x, y)$ and $\Delta b(x, y)$ of the pixels may be used as the error 111. Further, in the embodiment, the error 111 is set based on the display errors $\Delta E(x, y)$ of all pixels within the screen. Alternately, the error 111 may be set based on the display errors $\Delta E(x, y)$ of some pixels extracted from all of the pixels within the screen.

The control unit 112 compares the display error $\Delta E_{max}$ with a previously set threshold value. When the display error $\Delta E_{max}$ is smaller than the threshold value, the control unit 112 determines that the display error $\Delta E_{max}$ is sufficiently small.

When it is determined that the display error $\Delta E_{max}$ is sufficiently small, the control unit 112 inputs the light source intensity information 105 corresponding to the display error $\Delta E_{max}$ to a light source control unit 115 as emission intensity information 113, and inputs a corrected video signal 109*a* corresponding to the display error $\Delta E_{max}$, to a liquid crystal control unit 114.

When it is determined that the display error $\Delta E_{max}$ is not sufficiently small, the control unit 112 inputs the display errors $\Delta L_{max}$, $\Delta a_{max}$, $\Delta b_{max}$ and $\Delta E_{max}$ to the intensity setting unit 104 as error information 130. The intensity setting unit 104 updates the light source intensity information 105 based on the light source intensity information 105 and the error information 130, and inputs the updated light source intensity information 105 to the color presumption unit 106.

The update processing of the light source intensity information 105 according to the fifth embodiment will be described in detail. In the embodiment, the control unit 112 inputs the display errors $\Delta L_{max}$, $\Delta a_{max}$ and $\Delta b_{max}$ between the display image and the ideal image with respect to the L, a and b components of the CIELAB space, to the intensity setting unit 104, as the error information 130. The intensity setting unit 104 sets a change amount of the light source intensity information 105 of the colors of each illumination area according to the values of $\Delta L_{max}$, $\Delta a_{max}$ and $\Delta b_{max}$.

When the number of the colors of the light sources is three in accordance with three primary colors of R, G and B, $\Delta R(k)$, $\Delta G(k)$ and $\Delta B(k)$ which are intensity change amounts $\Delta R_{max}$, $\Delta G_{max}$ and $\Delta B_{max}$ of the R, G and B colors of each illumination area are obtained based on $\Delta L_{max}$, $\Delta a_{max}$ and $\Delta b_{max}$, and, using the intensity change amounts, the light source intensity information 105 is updated.

In order to obtain the intensity change amounts $\Delta R_{max}$, $\Delta G_{max}$ and $\Delta B_{max}$, for example, values $\Delta R$, $\Delta G$, $\Delta B$ which are capable of reducing $\Delta E_{max}$ most efficiently are set as the values $\Delta R_{max}$, $\Delta G_{max}$, $\Delta B_{max}$.

Alternately, $\Delta R_{max}$, $\Delta G_{max}$ and $\Delta B_{max}$ may be set by the following method. The largest value among $|\Delta L_{max}|$, $|\Delta a_{max}|$ and $|\Delta b_{max}|$ which are absolute values of $\Delta L_{max}$, $\Delta a_{max}$ and $\Delta b_{max}$ is obtained. Further, when $|\Delta L_{max}|$ is the largest value, the values $\Delta R$, $\Delta G$, $\Delta B$ which are capable of reducing $\Delta L_{max}$ most efficiently are set as the change amounts $\Delta R_{max}$, $\Delta G_{max}$ and $\Delta B_{max}$. When $|\Delta a_{max}|$ is the largest value, the values $\Delta R$, $\Delta G$ and $\Delta B$ which are capable of reducing $\Delta a_{max}$ most efficiently are set as the change amounts $\Delta R_{max}$, $\Delta G_{max}$ and $\Delta B_{max}$. In addition, when $|\Delta b_{max}|$ is the largest value, the values $\Delta R$, $\Delta G$ and $\Delta B$ which are capable of reducing $\Delta b_{max}$ most efficiently are set as the change amounts $\Delta R_{max}$, $\Delta G_{max}$ and $\Delta B_{max}$.

The values $\Delta R_{max}$, $\Delta G_{max}$ and $\Delta B_{max}$ may be obtained by calculation. A relation between $\Delta L_{max}$, $\Delta a_{max}$ and $\Delta b_{max}$ and the values $\Delta R_{max}$, $\Delta G_{max}$ and $\Delta B_{max}$ may be stored in a look-up table in advance, and the values $\Delta R_{max}$, $\Delta G_{max}$, $\Delta B_{max}$ may be calculated with reference to the look-up table.

The values of the display errors $\Delta L_{max}$, $\Delta a_{max}$ and $\Delta b_{max}$ reflect excess or shortage of light source intensities of the respective colors. For example, when the light source intensity of the R component is insufficient, the values of the display errors $\Delta L_{max}$, $\Delta a_{max}$ and $\Delta b_{max}$ are associated with a change amount $\Delta R_{max}$ of a positive value. On the contrary, when the light source intensity of the R component is excessive, the values of the display errors $\Delta L_{max}$, $\Delta a_{max}$ and $\Delta b_{max}$ are associated with a change amount $\Delta R_{max}$ of a negative value. This is similarly applied even when the number of light sources is not three that is necessary to produce three colors.

The intensity setting unit 104 sets the intensity change amounts of the respective color light sources of each illumination area, according to the intensity change amounts $\Delta R_{max}$, $\Delta G_{max}$, $\Delta B_{max}$ corresponding to the display errors $\Delta L_{max}$, $\Delta a_{max}$, $\Delta b_{max}$, light source intensity distributions $P_R(i, j)$, $P_G(i, j)$, $P_B(i, j)$ of the respective color light sources, and the position of an area in which $\Delta L_{max}$, $\Delta a_{max}$, $\Delta b_{max}$ are generated. For example, the intensity change amounts of an illumination area k is set by Formula 29.

$$\Delta R(k)=\Delta R_{max}\times P_R(m-x_{max},n-y_{max})$$

$$\Delta G(k)=\Delta G_{max}\times P_G(m-x_{max},n-y_{max})$$

$$\Delta B(k)=\Delta B_{max}\times P_B(m-x_{max},n-y_{max}) \quad (29)$$

In Formula 29, $\Delta R(k)$, $\Delta G(k)$ and $\Delta B(k)$ represent intensity change amounts of the illumination area k respectively. m and n represent an x coordinate and a y coordinate of the center position of the illumination area k, respectively. $x_{max}$ and $y_{max}$ represent an x coordinate and a y coordinate of a pixel position where the display errors $\Delta L_{max}$, $\Delta a_{max}$ and $\Delta b_{max}$ are generated, respectively. $P_R(i, j)$ represents the intensity of the light source intensity distribution of R light at a position (i, j). The same notation is applied to the light source intensity distributions of G light and B light.

Further, light source intensity values $R_{BL}(k)^i$, $G_{BL}(k)^i$, $B_{BL}(k)^i$ are updated based on $\Delta R(k)$, $\Delta G(k)$, $\Delta B(k)$ according to Formula 30. $R_{BL}(k)^i$, $G_{BL}(k)^i$, $B_{BL}(k)^i$ represent the light source intensities of the illumination area k calculated by an i-th update. The initial values of the light source intensity values are $R_{BL}(k)^0$, $G_{BL}(k)^0$, $B_{BL}(k)^0$.

$$R_{BL}(k)^{i+1}=R_{BL}(k)^i+\Delta R(k)$$

$$G_{BL}(k)^{i+1}=G_{BL}(k)^i+\Delta G(k)$$

$$B_{BL}(k)^{i+1}=B_{BL}(k)^i+\Delta B(k) \quad (30)$$

Then, the intensity distribution presumption unit 131, the color presumption unit 106, the signal correction unit 108, the error calculation unit 110, and the control unit 112 perform the above described processing based on the updated light source intensity information 105.

The update processing is repeated until the control unit 112 determines that the display error $\Delta E_{max}$ is sufficiently small. When the number of update times previously set is reached, the control unit 112 may set the lastly updated light source intensity information 105 as the emission intensity information 113.

The liquid crystal control unit 114 provides a liquid crystal control signal 116 to the liquid crystal panel, and displays an image of the corrected video signal 109*a* on a display area of the liquid crystal panel 118. Further, the light source control unit 115 provides a light source control signal 117 to the backlight 119, and performs control such that light having intensity according to the emission intensity information 113 is irradiated from the backlight 119.

As described above, according to the fifth embodiment, the screen is divided into a plurality of areas, and the light source intensity and the video signal can be controlled more precisely. Thus, an image can be displayed with a minimum error between an image desired to be displayed and an actually displayed image.

Figure 11:
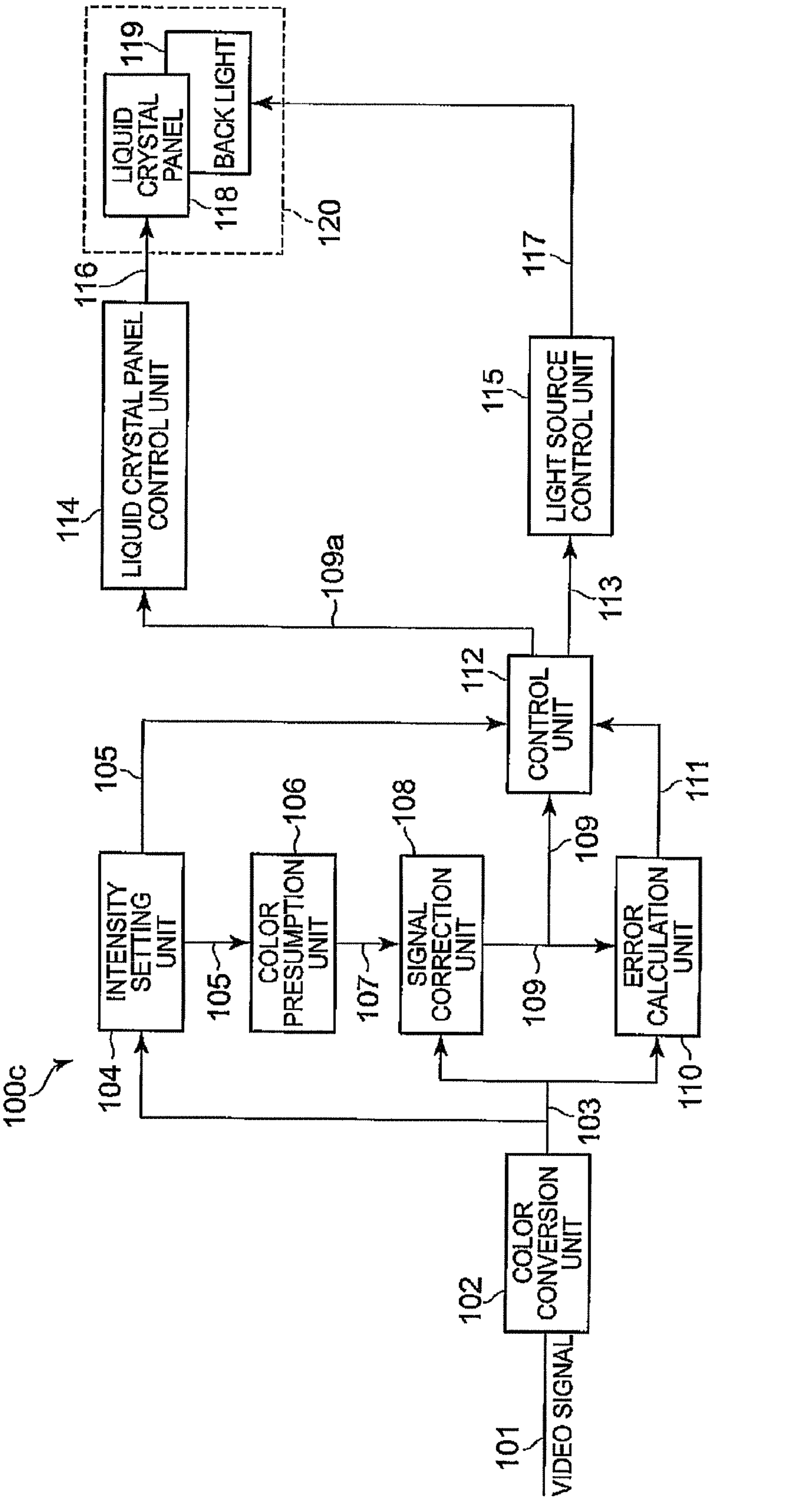
FIG. 11 is a block diagram of an LCD device according to a sixth embodiment.

A sixth embodiment will be described below. FIG. 11 is a block diagram of an LCD device according to the sixth embodiment. The basic configuration of an LCD device 100*c* of the sixth embodiment is same as that of the first embodiment. The sixth embodiment is different from the first embodiment in that an intensity setting unit 104 sets light source intensity information 105 according to a color-converted video signal 103. The following example shows a case where the colors of light sources are four colors of R, G, B and Cy, but the number of the colors of the light sources is not limited to four.

The intensity setting unit 104 of the embodiment sets the light source intensity information 105 according to the color-converted video signal 103. In order to calculate light source intensities of respective colors from the color-converted video signal, a plurality of methods are applicable. The following example uses a method of converting maximum values $X_{max}$, $Y_{max}$, $Z_{max}$ of tristimulus values of all pixels provided within a screen, into light source intensities $R_{BL}$, $G_{BL}$, $B_{BL}$, $C_{BL}$. A relation between the maximum values $X_{max}$, $Y_{max}$. $Z_{max}$ and the values $R_{BL}$, $G_{BL}$, $B_{BL}$, $C_{BL}$ may be represented by Formula 31 using a 3×4 tristimulus value matrix.

$$\begin{bmatrix} X_{max} \\ Y_{max} \\ Z_{max} \end{bmatrix} = \begin{bmatrix} X_R & X_G & X_B & X_C \\ Y_R & Y_G & Y_B & Y_C \\ Z_R & Z_G & Z_B & Z_C \end{bmatrix} \begin{bmatrix} R_{BL} \\ G_{BL} \\ B_{BL} \\ C_{BL} \end{bmatrix} \quad (31)$$

In the Formula 31, $X_R$, $Y_R$, and $Z_R$ represent tristimulus values which are given when an R light source emits light at maximum intensity. $X_G$, $Y_G$ and $Z_G$ represent tristimulus values which are given when a G light source emits light at maximum intensity. $X_B$, $Y_B$, $Z_B$ represent tristimulus values which are given when a B light source emits light at maximum intensity. $X_C$, $Y_C$, $Z_C$ represent tristimulus values which are given when a Cy light source emits light at maximum intensity.

The maximum values $X_{max}$, $Y_{max}$ and $Z_{max}$ are three elements, but the values $R_{BL}$, $G_{BL}$, $B_{BL}$, $C_{BL}$ are four elements. Thus, Formula 31 has a higher degree of freedom, and $R_{BL}$, $G_{BL}$, $B_{BL}$, $C_{BL}$ which satisfy Formula 31 are not determined uniquely. Accordingly, the light source intensity information 105 may be obtained by the following processing. A plurality of values is set for the intensity of a light source of a certain color. Further, the intensities of light sources of the remaining colors which satisfy Formula 31 are calculated with respect to each of the values. A combination of a plurality of light source intensities which satisfies the Formula 31 can be calculated, and the combination is set as the light source intensity information 105.

The intensity setting unit 104 provides the light source intensity information 105 to a color presumption unit 106. The color presumption unit 106 presumes tristimulus values of a light to be obtained after a mixture of lights which are emitted from light sources of respective colors passes through a liquid crystal panel, similarly to the first embodiment. A signal correction unit 108 calculates a corrected video signal 109 based on color information 107 of the transmitted light and the color-converted video signal 103, and provides the calculated corrected video signal 109 to an error calculation unit 110.

The error calculation unit 110 calculates an error 111 from the corrected video signal 109 and the input video signal 103. A control unit 112 determines the light source intensity information having a minimum error as emission intensity information 113, with reference to pieces of light source intensity information 105 set by the light source setting unit 104 and the errors corresponding to the pieces of light source intensity information 105.

The control unit 112 provides the emission intensity information 113 to a light source control unit 115. The control unit 112 provides a corrected video signal 109*a* corresponding to the emission intensity information 113, to a liquid crystal control unit 114. The liquid crystal control unit 114 provides a liquid crystal control signal 116 to a liquid crystal panel 118, and displays the corrected video signal 109*a* on a display area of the liquid crystal panel 118. Further, the light source control unit 115 provides a light source control signal 117 to a backlight 119, and performs control such that a light having intensity according to the emission intensity information 113 is irradiated from the backlight 119.

As described above, according to the sixth embodiment, an image can be displayed with a minimum error between an image desired to be displayed and an actually displayed image. The image can be displayed through a small number of calculations, without calculating and evaluating errors to be caused according to the pieces of light source intensity information of an enormous number of combinations of light source intensities.

A seventh embodiment will be described below. In an LCD device of the seventh embodiment, in addition to the configuration of the LCD device of the first embodiment, a backlight 119 is provided with light sources of a plurality of colors which are capable of controlling light source intensities of respective colors independently for each of a plurality of display areas. The display areas are obtained by dividing a screen. The light sources have different emission peak wavelengths. The following example shows a case where the light sources emit three colors of R, G and B, but the number of colors of the light sources is not limited to three.

A backlight of the embodiment has the same basic configuration as the backlight 119 of the first embodiment illustrated in FIGS. 2A and 2B. The backlight can control intensities of an R light source 122, a G light source 123 and a B light source 124 for each light source 121 illustrated in FIG. 2A, individually. The illumination area of each of the light sources 121 is a portion of a display area of the liquid crystal panel 120 which corresponds to one of areas obtained by dividing the display area virtually. The illumination area of each of the light sources 121 is defined based on a spatial arrangement of the light sources 121 on the backlight 119.

An illumination area of a video image which corresponds to the input video signal 103 and is displayed in the vicinity of the position of each light source 121 is defined for each light source 121, in advance.

An intensity setting unit 104 sets light source intensity information 105 of R, G and B for each illumination area, and provides the light source intensity information 105 to a color presumption unit 106.

The color presumption unit 106 presumes tristimulus values of a light to be obtained after a mixture of lights which are irradiated from light sources of respective colors to each pixel position of a liquid crystal panel for each illumination area passes through the liquid crystal panel. In the embodiment, the tristimulus values of the transmitted light are presumed under the assumption that a pixel within each illumination area is irradiated with a light having the same intensity as emission intensity of a light source of the illumination area but not irradiated with lights of the light sources of the other illumination areas. A signal correction unit 108 calculates a corrected video signal 109 based on color information 107 of the transmitted light and a video signal 103, and provides the calculated corrected video signal 109 to an error calculation unit 110.

Further, similarly to the first embodiment, the error calculation unit 110 calculates an error 111 based on the corrected video signal 109 and the color-converted video signal 103. In the embodiment, a display error $\Delta E(x, y)$ of a pixel is provided to a control unit 112, as the error 111 for each illumination area. The display error $\Delta E(x, y)$ is largest among the display errors of pixels provided within the illumination area The control unit 112 determines a light source intensity information having a minimum error for each illumination area as emission intensity information 113, with reference to the pieces of light source intensity information 105 which are set by the light source setting unit 104 for each illumination area, and the errors 111 corresponding to the pieces of light source intensity information 105.

The control unit 112 provides the emission intensity information 113 to a light source control unit 115. The control unit 112 provides a corrected video signal 109*a* corresponding to the emission intensity information 113 to a liquid crystal control unit 114. The liquid crystal control unit 114 provides a liquid crystal control signal 116 to a liquid crystal panel 118, and displays the corrected video signal 109*a* on a display area of the liquid crystal panel 118. Further, the light source control unit 115 provides a light source control signal 117 to a backlight 119, and performs control such that a light having intensity according to the emission intensity information 113 is irradiated from the backlight 119.

As described above, according to the seventh embodiment, the screen is divided into a plurality of areas, and the light source intensity and the video signal are controlled more precisely. Thus, an image can be displayed with a minimum error between an image desired to be displayed and an actually displayed image.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image display device, comprising:

a liquid crystal panel;

a backlight having a plurality of light sources which emit lights having different peak wavelengths, emission intensities of the light sources being independently controllable, respectively;

an intensity setting unit to set intensities of the plurality of light sources, respectively;

a presumption unit to presume color information of a transmitted light to be obtained when a mixture of lights emitted from the light sources at the intensities passes through the liquid crystal panel, based on intensity information representing the intensities set by the intensity setting unit;

a signal correction unit to correct an input video signal according to the color information, and to obtain a corrected video signal;

an error calculation unit to presume a display image to be obtained when the liquid crystal panel receives the corrected video signal and the mixture light enters into the liquid crystal panel, the error calculation unit calculating display errors in brightness and color between the presumed display image and an input image corresponding to the input video signal; and a control unit to control setting the intensities of the light sources as the emission intensities of the backlight so that the display errors obtained from the error calculation unit can be minimum.

2. The device according to claim 1, wherein the error calculation unit calculates errors between the input, image and the presumed display image with respect to a plurality of pixels, and uses maximum values of the calculated errors as the display errors.

3. The device according to claim 2, wherein the error calculation unit calculates the display errors as a combination of a color error and a brightness error in an equivalent color space.

4. The device according to claim 3, wherein the presumption unit stores a measured value of the color information obtained when the light sources emit monochromatic lights in advance, and the presumption unit adds the values obtained by multiplying the measured value by the intensities of the light sources, so as to presume the color information of the transmitted light.

5. The device according to claim 4, wherein the backlight is provided with a plurality of unit light sources respectively associated with a plurality of areas within a screen of the liquid crystal panel, and each of the unit light sources has a set of a plurality of light sources which emit lights having different peak wavelengths, the emission intensities of the light sources are independently controllable, and wherein the emission intensities can be controlled for each unit light source, and the intensity setting unit sets an intensity for each unit light source.

6. The device according to claim 4, wherein the intensity setting unit sets the intensities of the light sources according to the input video signal.

7. The device according to claim 6, wherein the intensity setting unit resets the intensities of the light sources according the display errors.

8. The device according to claim 4, wherein the intensity setting unit outputs all combinations of intensities with respect to all of the plurality of light sources sequentially while changing the values of the intensities with a predetermined gradation level, the presumption unit presumes color information corresponding to each of all combinations of the intensities, and the error calculation unit calculates the display errors corresponding to each of all combinations of the intensities.

9. The device according to claim 1, further comprising an intensity distribution presumption unit, wherein the intensity distribution presumption unit presumes a spatial distributions of the intensities based on the intensity information of the light sources provided from the intensity setting unit, and outputs the presumed spatial distributions to the presumption unit so as to presuming the color information.

* * * * *